(12) United States Patent
Sullivan et al.

(10) Patent No.: US 10,058,740 B2
(45) Date of Patent: Aug. 28, 2018

(54) LOW COMPRESSION GOLF BALLS HAVING LAYERS MADE FROM PLASTICIZED THERMOPLASTIC MATERIALS

(71) Applicant: Acushnet Company, Fairhaven, MA (US)

(72) Inventors: Michael J. Sullivan, Old Lyme, CT (US); Mark L. Binette, Mattapoisett, MA (US); Robert Blink, Newport, RI (US); David A. Bulpett, Boston, MA (US); Brian Comeau, Berkley, MA (US); John D. Farrell, Providence, RI (US); Douglas S. Goguen, New Bedford, MA (US)

(73) Assignee: Acushnet Company, Fairhaven, MA (US)

( * ) Notice: Subject to any disclaimer, the term of this patent is extended or adjusted under 35 U.S.C. 154(b) by 0 days.

(21) Appl. No.: 15/480,727

(22) Filed: Apr. 6, 2017

(65) Prior Publication Data

US 2017/0209747 A1    Jul. 27, 2017

Related U.S. Application Data

(60) Division of application No. 14/619,231, filed on Feb. 11, 2015, now Pat. No. 9,616,297, which is a continuation-in-part of application No. 14/511,221, filed on Oct. 10, 2014, now Pat. No. 9,604,106, which is a continuation-in-part of application No. 14/460,416, filed on Aug. 15, 2014, now Pat. No.
(Continued)

(51) Int. Cl.
*A63B 37/06* (2006.01)
*A63B 37/00* (2006.01)
*C08L 21/00* (2006.01)
*A63B 45/00* (2006.01)

(52) U.S. Cl.
CPC ........ *A63B 37/0043* (2013.01); *A63B 37/006* (2013.01); *A63B 37/0031* (2013.01); *A63B 37/0039* (2013.01); *A63B 37/0063* (2013.01); *A63B 37/0074* (2013.01); *A63B 37/0075* (2013.01); *A63B 37/0076* (2013.01); *A63B 37/0092* (2013.01); *C08L 21/00* (2013.01); *A63B 45/00* (2013.01)

(58) Field of Classification Search
CPC ........................ A63B 37/0076; A63B 37/0092
USPC ........................................................ 473/376
See application file for complete search history.

(56) References Cited

U.S. PATENT DOCUMENTS

| 4,104,216 A | 8/1978 | Clampitt |
| 4,919,434 A | 4/1990 | Saito |

(Continued)

*Primary Examiner* — Raeann Gorden
(74) *Attorney, Agent, or Firm* — Daniel W. Sullivan

(57) ABSTRACT

Low compression, multi-piece golf balls containing a solid core and two or three-layered cover assemblies are provided. Preferably, the ball has a compression of less than 60 and more preferably less than 50. At least one cover layer is made of a plasticized thermoplastic composition. For example, two-layered and three-layered covers may be made. Preferably, the plasticized thermoplastic composition comprises: a) ethylene acid copolymer, b) plasticizer, and c) cation source. A fatty acid ester such as ethyl oleate or butyl oleate is preferably used as the plasticizer. The cover assembly has good impact durability and helps provide the ball with relatively high resiliency at given compressions.

6 Claims, 6 Drawing Sheets

Related U.S. Application Data 9,526,948, which is a continuation-in-part of application No. 14/145,578, filed on Dec. 31, 2013, now Pat. No. 9,573,022, which is a continuation-in-part of application No. 13/323,128, filed on Dec. 12, 2011, now Pat. No. 8,715,112, which is a division of application No. 12/423,921, filed on Apr. 15, 2009, now Pat. No. 8,075,423, which is a continuation-in-part of application No. 12/407,856, filed on Mar. 20, 2009, now Pat. No. 7,708,656, which is a continuation-in-part of application No. 11/972,240, filed on Jan. 10, 2008, now Pat. No. 7,722,482, said application No. 12/423,921 is a continuation-in-part of application No. 12/407,865, filed on Mar. 20, 2009, now Pat. No. 7,713,145, which is a continuation-in-part of application No. 11/972,240.

(56) References Cited

U.S. PATENT DOCUMENTS

| | | | |
|---|---|---|---|
| 5,183,843 A | 2/1993 | Sakai et al. | |
| 5,527,847 A | 6/1996 | Mumco et al. | |
| 5,683,817 A | 11/1997 | Kenmochi | |
| 5,803,831 A * | 9/1998 | Sullivan | A63B 37/0003 273/DIG. 22 |
| 5,947,842 A | 9/1999 | Cavallaro et al. | |
| 5,973,046 A | 10/1999 | Chen et al. | |
| 6,117,025 A * | 9/2000 | Sullivan | A63B 37/0003 473/373 |
| 6,306,049 B1 | 10/2001 | Rajagopalan | |
| 6,329,458 B1 | 12/2001 | Takesue et al. | |
| 6,416,425 B1 | 7/2002 | Maruko et al. | |
| 6,419,595 B1 | 7/2002 | Maruko et al. | |
| 6,461,251 B1 | 10/2002 | Yamagishi et al. | |
| 6,527,652 B1 | 3/2003 | Maruko et al. | |
| 6,565,455 B2 * | 5/2003 | Hayashi | A63B 37/0003 473/351 |
| 6,653,382 B1 | 11/2003 | Statz et al. | |
| 6,688,991 B2 | 2/2004 | Sullivan et al. | |
| 6,756,436 B2 | 6/2004 | Rajagopalan et al. | |
| 6,815,480 B2 | 11/2004 | Statz et al. | |
| 6,872,774 B2 | 3/2005 | Sullivan et al. | |
| 7,144,938 B1 | 12/2006 | Feinberg et al. | |
| 7,259,191 B2 | 8/2007 | Sullivan et al. | |
| 7,312,267 B2 | 12/2007 | Kennedy, III et al. | |
| 7,365,128 B2 | 4/2008 | Sullivan | |
| 7,431,669 B2 | 10/2008 | Lemons et al. | |
| 7,452,291 B2 | 11/2008 | Sullivan et al. | |
| 7,612,134 B2 | 11/2009 | Kennedy, III et al. | |
| 7,612,135 B2 | 11/2009 | Kennedy, III et al. | |
| 7,918,748 B2 | 4/2011 | Ogg et al. | |
| 8,044,136 B2 | 10/2011 | De Garavilla | |
| 8,202,925 B2 | 6/2012 | De Garavilla | |
| 8,410,220 B2 | 4/2013 | Chen | |
| 2002/0151380 A1 | 10/2002 | Sullivan | |
| 2003/0013549 A1 | 1/2003 | Rajagopalan et al. | |
| 2004/0209705 A1 | 10/2004 | Rajagopalan et al. | |
| 2004/0235587 A1 | 11/2004 | Sullivan | |
| 2006/0073914 A1 | 4/2006 | Sullivan et al. | |
| 2006/0264269 A1 | 11/2006 | Rajagopalan et al. | |
| 2006/0293464 A1 | 12/2006 | Rajagopalan et al. | |
| 2007/0100085 A1 | 5/2007 | Hyun | |
| 2007/0155542 A1 | 7/2007 | Sullivan et al. | |
| 2008/0220902 A1 | 9/2008 | Sullivan et al. | |
| 2008/0220903 A1 | 9/2008 | Sullivan et al. | |
| 2008/0227568 A1 | 9/2008 | Sullivan et al. | |
| 2008/0242448 A1 | 10/2008 | Sullivan et al. | |
| 2008/0261723 A1 | 10/2008 | Sullivan et al. | |
| 2009/0170634 A1 | 7/2009 | Loper et al. | |
| 2013/0260919 A1 | 10/2013 | Kennedy, III et al. | |

\* cited by examiner

LOW COMPRESSION GOLF BALLS HAVING LAYERS MADE FROM PLASTICIZED THERMOPLASTIC MATERIALS

CROSS-REFERENCE TO RELATED APPLICATIONS

This application is a divisional of co-assigned, U.S. patent application Ser. No. 14/619,231 filed Feb. 11, 2015, now allowed, which is a continuation-in-part of co-assigned U.S. patent application Ser. No. 14/511,221 filed Oct. 10, 2014, now U.S. Pat. No. 9,604,106, which is continuation-in-part of co-assigned U.S. patent application Ser. No. 14/460,416 filed Aug. 15, 2014, now U.S. Pat. No. 9,526,948, which is a continuation-in-part of co-assigned U.S. patent application Ser. No. 14/145,578 filed Dec. 31, 2013, now U.S. Pat. No. 9,573,022, which is a continuation-in-part of U.S. patent application Ser. No. 13/323,128, filed Dec. 12, 2011, now U.S. Pat. No. 8,715,112, which is a divisional of U.S. patent application Ser. No. 12/423,921, filed Apr. 15, 2009, now U.S. Pat. No. 8,075,423. U.S. patent application Ser. No. 12/423,921 is a continuation-in-part of U.S. patent application Ser. No. 12/407,856, filed Mar. 20, 2009, now U.S. Pat. No. 7,708,656, which is a continuation-in-part of U.S. patent application Ser. No. 11/972,240, filed Jan. 10, 2008, now U.S. Pat. No. 7,722,482. U.S. patent application Ser. No. 12/423,921 is also a continuation-in-part of Ser. No. 12/407,865, filed Mar. 20, 2009, now U.S. Pat. No. 7,713,145, which is a continuation-in-part of U.S. patent application Ser. No. 11/972,240, filed Jan. 10, 2008, now U.S. Pat. No. 7,722,482. The entire disclosure of each of these related applications is hereby incorporated herein by reference.

BACKGROUND OF THE INVENTION

Field of the Invention

The present invention relates generally to low compression multi-piece golf balls having a solid core and multi-layered cover, wherein at least one of the cover layers is made of a plasticized thermoplastic composition. Preferably, the ball has a compression of less than 60 and more preferably less than 50. In one example, a two-layer cover including inner and outer cover layers may be made. In another example, there is a three-layer cover including inner, intermediate, and outer cover layers. Preferably, the plasticized thermoplastic composition comprises an ethylene acid copolymer ionomer and plasticizer.

Brief Review of the Related Art

Multi-layered, solid golf balls are used today by recreational and professional golfers. In general, these golf balls contain an inner core protected by a cover. The core acts as the primary engine for the ball and the cover protects the core and helps provide the ball with durability and wear-resistance. The core and cover may be single or multi-layered. For example, three-piece golf balls having an inner core, inner cover layer, and outer cover layer are popular. In other instances, golfers will use a four-piece ball containing a dual-core (inner core and surrounding outer-core layer) and dual-cover (inner cover layer and surrounding outer cover layer). Intermediate layer(s) may be disposed between the core and cover layers to impart various properties. Thus, five-piece and even six-piece balls can be made. Normally, the core layers are made of a natural or synthetic rubber material or an ionomer polymer. These ionomer polymers are typically copolymers of ethylene and methacrylic acid or acrylic acid that are partially or fully neutralized. In particular, highly neutralized polymer (HNP) compositions may be used to form a core layer. Metal ions such as sodium, lithium, zinc, and magnesium are commonly used to neutralize the acid groups in the copolymer.

Such ethylene acid copolymer ionomer resins generally have good durability and toughness. These ionomers may be used to make cover, intermediate, and core layers for the golf ball. When used as a core material, the ionomer resin helps impart a higher initial velocity to the golf ball. When used as a cover material, the ionomer resin helps impart impact durability, wear-resistance, and cut/shear-resistance to the golf ball.

Many golf balls used today have multi-layered covers comprising an inner cover and surrounding outer cover layer. For example, the inner cover may be made of a relatively hard material such as the above-described ethylene acid copolymer ionomer resin. Meanwhile, the outer cover layer may be made of a relatively soft polyurethane or polyurethane composition. Also, three-layered covers, wherein the cover structure includes an inner cover, intermediate cover, and outer cover layer may be made. For example, Sullivan, US Patent Application Publication 2002/0151380 discloses a golf ball having a core and cover wherein the cover comprises: a) an inner cover layer having a first thickness and being disposed directly about the core; b) an outer cover layer having a second thickness no greater than about 0.050 inches; and c) an intermediate cover layer having a third thickness and being disposed between the inner and outer cover layers; wherein the outer cover layer comprises a composition formed of a reactive liquid material (thermoset material comprising polyurethane, polyurea, polyurethane ionomer, epoxy, or a mixture thereof) and the combination of the first, second, and third thickness is no greater than about 0.125 inches.

Sullivan et al., US Patent Application Publication 2004/0235587 discloses a golf ball having a core and a cover comprising: an inner cover layer; an outer cover layer having a material hardness of 60 Shore D or less; and an intermediate cover layer disposed between the inner and outer cover layers. At least two of the inner, intermediate, and outer cover layers comprise a non-ionomeric material. Preferably, the outer cover layer comprises a polyurethane, a polyurea, a copolymer of a polyurethane, a copolymer of a polyurea, or an interpenetrating polymer network.

In recent years, golf balls having a lower compression and spin rate have been developed. For example, three-piece balls containing an inner core and outer core layer (or intermediate layer) made of polybutadiene rubber and outer cover made of ionomer resin have been developed. These relatively low compression and low spin balls are particularly desirable when making driver shots off the tee, because the balls generally have good flight distance. Also, lower compression balls have a generally softer feel and many golfers find that a softer, more natural feel is advantageous when making putt shots on the greens of a golf course. The feel of the ball primarily depends upon the hardness and compression of the ball.

Golf balls having a relatively low compression are described in the patent literature. For example, Ogg et al., U.S. Pat. No. 7,918,748 discloses a two-piece golf ball comprising a core comprising made of a neodymium-catalyzed polybutadiene composition, and a cover made of partially-neutralized ethylene acid copolymer composition, wherein the golf ball has a diameter of at least 1.68 inches, a mass of at least 45 grams, a coefficient of restitution of at least 0.780, and a PGA compression ranging from 35 to 50. Lemons et al., U.S. Pat. No. 7,431,669 discloses a low compression golf ball, wherein the core is formed of polybutadiene rubber that produces a zero (or less) compression. The mantle is molded around the core using ethylene, acrylic acid and n-butyl acrylate terpolymers, with 100% of the acrylic acid groups neutralized with metal ions. The cover is molded using conventional ethylene acid copolymer ionomers. Cavallaro, U.S. Pat. No. 5,947,842 discloses a low-spin multi-layer golf ball containing a core, a cover layer, and a mantle layer disposed between the core and cover layer. The core preferably has a compression of less than 80 points and more preferably less than 60 points. According to the '842 patent, calcium oxide can be added to the core composition in place of zinc oxide and this helps reduce core compression by at least about 2 compression points. Loper et al., US Patent Application Publication 2009/0170634 discloses a golf ball comprising: (a) a core; (b) an inner mantle layer; (c) an intermediate mantle layer; (d) an outer mantle layer; and (e) at least one cover layer; wherein the mantle layers may be made of various ionomer compositions, and the core has a PGA compression of less than 70, and the combined sub-assembly of core/inner mantle layer/intermediate mantle layer has a PGA compression of at least 30.

Although some of the above-described compositions may be somewhat effective for making certain components and layers in a multi-piece golf ball, there is still a need for new compositions that can impart high performance properties to the ball. In particular, there is a continuing need for improved cover constructions in golf balls. The cover material should help provide the ball with a relatively low compression and a soft feel. The ball should have good spin control. At the same time, the impact durability and resiliency (as measured by Coefficient of Restitution) properties of the ball should not be sacrificed. The ball should have high impact durability and resiliency. The present invention provides golf balls having an optimum combination of properties.

SUMMARY OF THE INVENTION

The present invention generally relates to multi-layered golf balls and more particularly to golf balls having at least one layer made of thermoplastic ethylene acid copolymer/plasticizer compositions. In one version, the ball comprises a core having at least one layer and a two-layered cover assembly including an inner cover comprising a thermoplastic material and a surrounding outer cover, wherein the ball has a compression of less than 60. For example, the ball may have a compression in the range of about 25 to about 55 or more particularly in the range of 30 to 50. Preferably, the thermoplastic composition comprises: i) an acid copolymer of ethylene and an α,β-unsaturated carboxylic acid, optionally including a softening monomer selected from the group consisting of alkyl acrylates and methacrylates; ii) a plasticizer; and iii) a cation source present in an amount sufficient to neutralize from about 0% to about 100% of all acid groups present in the composition. In one embodiment, the inner cover layer has a Shore D midpoint hardness in the range of about 25 to about 58 Shore D, and the outer cover layer has Shore D surface hardness in the range of about 48 to about 71 Shore D, wherein the hardness of the outer cover layer is greater than the hardness of the inner cover layer.

Various plasticizers may be used in the thermoplastic composition. In one particularly preferred version, the thermoplastic composition comprises a fatty acid ester, particularly an alkyl oleate, and more particularly ethyl oleate or butyl oleate. Preferably, the thermoplastic composition comprises about 3 to about 50% by weight plasticizer, more preferably about 8 to about 42%, and even more preferably about 10 to about 30%, plasticizer based on weight of composition.

In another version, the ball comprises a two-layered cover assembly including an inner cover comprising an ethylene acid copolymer thermoplastic material as described above and a surrounding outer cover. In this embodiment, the inner cover layer has a Shore D midpoint hardness in the range of about 55 to about 75 Shore D, and the outer cover layer has Shore D surface hardness in the range of about 15 to about 60 Shore D, wherein the hardness of the outer cover layer is less than the hardness of the inner cover layer.

In yet another version, the ball comprises a three-layered cover assembly including an inner cover, an intermediate cover layer comprising a thermoplastic composition, and a surrounding outer cover, wherein the ball has a compression of less than 60. For example, the ball may have a compression in the range of about 25 to about 55 or more particularly in the range of 30 to 50. Preferably, the thermoplastic composition comprises: i) an acid copolymer of ethylene and an α,β-unsaturated carboxylic acid, optionally including a softening monomer selected from the group consisting of alkyl acrylates and methacrylates; ii) a plasticizer; and iii) a cation source present in an amount sufficient to neutralize from about 0% to about 100% of all acid groups present in the composition. The inner and outer cover layers may comprise various materials including partially or highly neutralized ethylene acid copolymer compositions. In other embodiments, the inner cover layer and/or outer cover may be made of the plasticized thermoplastic composition of this invention.

BRIEF DESCRIPTION OF THE DRAWINGS

The novel features that are characteristic of the present invention are set forth in the appended claims. However, the preferred embodiments of the invention, together with further objects and attendant advantages, are best understood by reference to the following detailed description in connection with the accompanying drawings in which:

DETAILED DESCRIPTION OF THE INVENTION

Golf Ball Constructions

Figure 1:
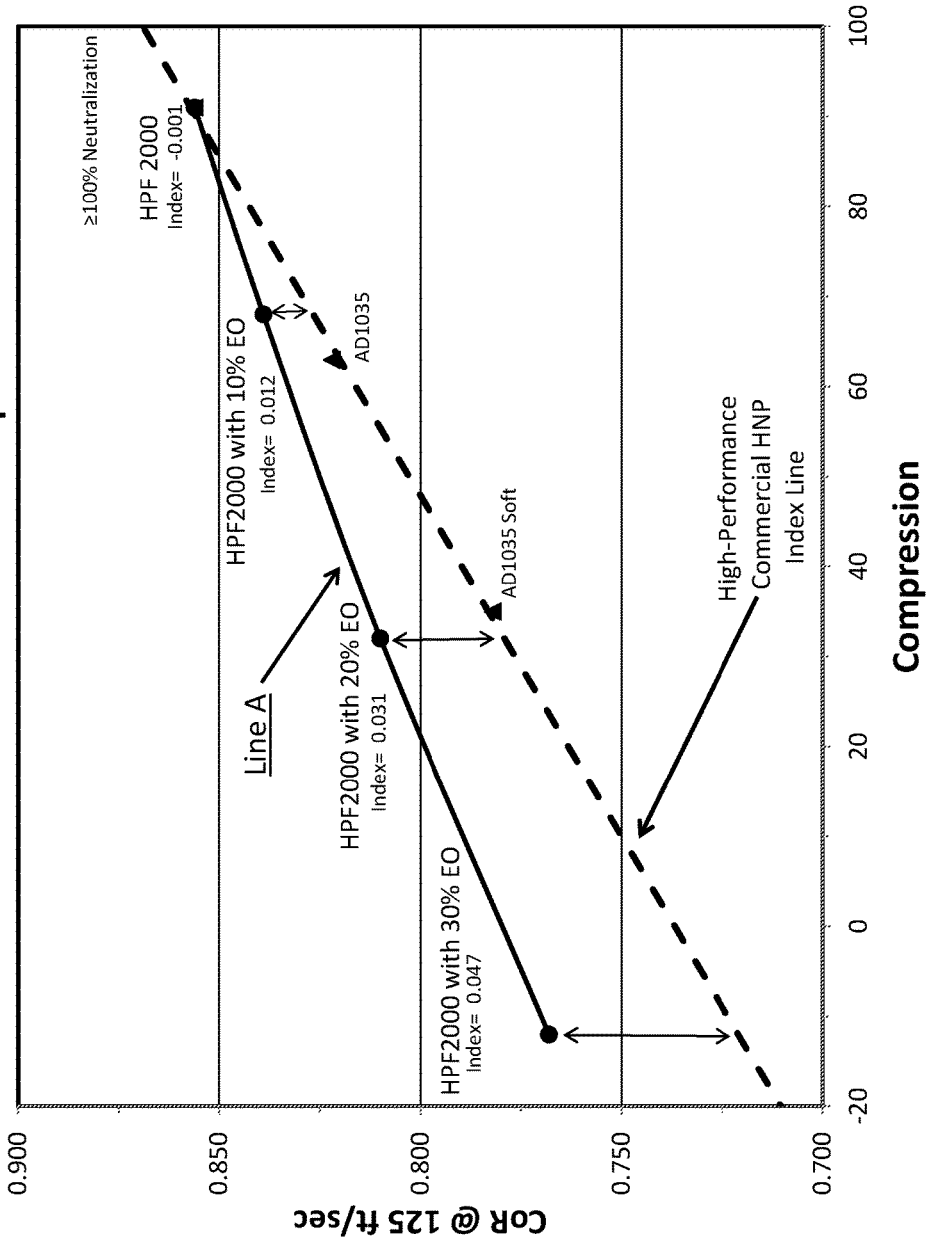
FIG. 1 is a graph showing the Coefficient of Restitution (COR) of commercially-available samples and ethylene acid copolymer/plasticizer samples of this invention plotted against the Compression of the respective samples and includes an Index Line.

Golf balls having various constructions may be made in accordance with this invention. For example, golf balls having one-piece, two-piece, three-piece, four-piece, and five or more-piece constructions with the term "piece" referring to any core, cover or intermediate layer of a golf ball construction. Representative illustrations of such golf ball constructions are provided and discussed further below. The term, "layer" as used herein means generally any spherical portion of the golf ball. More particularly, in one version, a one-piece ball is made using the inventive composition as the entire golf ball excluding any paint or coating and indicia applied thereon. In a second version, a two-piece ball comprising a single core and a single cover layer is made. In a third version, a three-piece golf ball containing a dual-layered core and single-layered cover is made. The dual-core includes an inner core (center) and surrounding outer core layer. In another version, a three-piece ball containing a single core layer and two cover layers is made. In yet another version, a four-piece golf ball containing a dual-core and dual-cover (inner cover and outer cover layers) is made. In yet another construction, a four-piece or five-piece golf ball containing a dual-core; an inner cover layer, an intermediate cover and an outer cover layer, may be made. In still another construction, a five-piece ball is made containing an innermost core layer (or center), an intermediate core layer, an outer core layer, an inner cover layer and an outer cover layer. The diameter and thickness of the different layers along with properties such as hardness and compression may vary depending upon the construction and desired playing performance properties of the golf ball. Any one or more of the layers of any of the one, two, three, four, or five, or more-piece (layered) balls described above may comprise a plasticized thermoplastic composition as disclosed herein. That is, any of the inner (center) core and/or outer core layers, and/or inner, intermediate, or outer cover layers may comprise a plasticized composition of this invention.

In one preferred version, a three-piece golf ball consisting of an inner core, an inner cover layer made of a plasticized thermoplastic composition, and an outer cover, wherein the ball has a compression of less than 60, is formed. In one embodiment, the ball has a compression in the range of about 25 to about 55 and more particularly in the range of 30 to 50. In another preferred version, a four-piece golf ball consisting of an inner core, an inner cover layer, an intermediate cover layer made of a plasticized thermoplastic composition, and an outer cover layer, wherein the ball has a compression of less than 60, is produced. In another embodiment, the golf balls have a compression within a range of about negative 60 to positive 55. For example, the compression range may be about negative 20 to positive, particularly about zero to about positive 35, and more particularly about 1 to about positive 30. In a particularly preferred embodiment, the plasticized HNP composition comprises about 1 to about 15% by weight of filler such as barium sulfate based on weight of composition. These golf ball embodiments including plasticized thermoplastic compositions are discussed in further detail below.

Highly-Neutralized Polymer Compositions

Highly-neutralized polymer compositions (HNPs) may be used to form any cover layer in accordance with the present invention. Suitable HNP compositions, which are plasticized per this invention, comprise an HNP and optionally melt-flow modifier(s), additive(s), and/or filler(s). For purposes of the present disclosure, "HNP" refers to an acid polymer after at least 70%, preferably at least 80%, more preferably at least 90%, more preferably at least 95%, and even more preferably 100%, of the acid groups present are neutralized. It is understood that the HNP may be a blend of two or more HNPs. Preferred acid polymers are copolymers of an $\alpha$-olefin and a $C_3$-$C_8$ $\alpha,\beta$-ethylenically unsaturated carboxylic acid, optionally including a softening monomer. The $\alpha$-olefin is preferably selected from ethylene and propylene. The acid is preferably selected from (meth) acrylic acid, ethacrylic acid, maleic acid, crotonic acid, fumaric acid, and itaconic acid. (Meth) acrylic acid is particularly preferred. The optional softening monomer is preferably selected from alkyl (meth) acrylate, wherein the alkyl groups have from 1 to 8 carbon atoms. Preferred acid copolymers include, but are not limited to, those wherein the $\alpha$-olefin is ethylene, the acid is (meth) acrylic acid, and the optional softening monomer is selected from (meth) acrylate, n-butyl (meth) acrylate, isobutyl (meth) acrylate, methyl (meth) acrylate, and ethyl (meth) acrylate. Particularly preferred acid copolymers include, but are not limited to, ethylene/(meth) acrylic acid/n-butyl acrylate, ethylene/(meth) acrylic acid/methyl acrylate, and ethylene/(meth) acrylic acid/ethyl acrylate.

Suitable acid copolymers for forming the HNP also include acid polymers that are already partially neutralized. Examples of suitable partially neutralized acid copolymers include, but are not limited to, Surlyn® ionomers, commercially available from E. I. du Pont de Nemours and Company; AClyn® ionomers, commercially available from Honeywell International Inc.; and Iotek® ionomers, commercially available from ExxonMobil Chemical Company. Also suitable are DuPont® HPF 1000 and DuPont® HPF 2000, ionomeric materials commercially available from E. I. du Pont de Nemours and Company. In some embodiments, very low modulus ionomer- ("VLMI-") type ethylene-acid copolymers are particularly suitable for forming the HNP, such as Surlyn® 6320, Surlyn® 8120, Surlyn® 8320, and Surlyn® 9320, commercially available from E. I. du Pont de Nemours and Company.

The $\alpha$-olefin is typically present in the acid copolymer in an amount of 15 wt % or greater, or 25 wt % or greater, or 40 wt % or greater, or 60 wt % or greater, based on the total weight of the acid copolymer. The acid is typically present in the acid copolymer in an amount within a range having a lower limit of 1 or 2 or 4 or 6 or 8 or 10 or 12 or 15 or 16 or 20 wt % and an upper limit of 20 or 25 or 26 or 30 or 35 or 40 wt %, based on the total weight of the acid copolymer. The optional softening monomer is typically present in the acid copolymer in an amount within a range having a lower limit of 0 or 1 or 3 or 5 or 11 or 15 or 20 wt % and an upper limit of 23 or 25 or 30 or 35 or 50 wt %, based on the total weight of the acid copolymer.

Additional suitable acid copolymers are more fully described, for example, in U.S. Pat. Nos. 5,691,418, 6,562,906, 6,653,382, 6,777,472, 6,762,246, 6,815,480, and 6,953,820 and U.S. Patent Application Publication Nos. 2005/0148725, 2005/0049367, 2005/0020741, 2004/0220343, and 2003/0130434, the entire disclosures of which are hereby incorporated herein by reference.

The HNP is formed by reacting the acid copolymer with a sufficient amount of cation source, optionally in the presence of a high molecular weight organic acid or salt thereof, such that at least 70%, preferably at least 80%, more preferably at least 90%, more preferably at least 95%, and even more preferably 100%, of all acid groups present are neutralized. The resulting HNP composition is plasticized with a plasticizer. Suitable plasticizers are described further below. In a particular embodiment, the cation source is present in an amount sufficient to neutralize, theoretically, greater than 100%, or 105% or greater, or 110% or greater, or 115% or greater, or 120% or greater, or 125% or greater, or 200% or greater, or 250% or greater of all acid groups present in the composition. The acid copolymer can be reacted with the optional high molecular weight organic acid or salt thereof and the cation source simultaneously, or the acid copolymer can be reacted with the optional high molecular weight organic acid or salt thereof prior to the addition of the cation source.

Suitable cation sources include metal ions and compounds of alkali metals, alkaline earth metals, and transition metals; metal ions and compounds of rare earth elements; and combinations thereof. Preferred cation sources are metal ions and compounds of magnesium, sodium, potassium, cesium, calcium, barium, manganese, copper, zinc, tin, lithium, and rare earth metals. The acid copolymer may be at least partially neutralized prior to contacting the acid copolymer with the cation source to form the HNP. Methods of preparing ionomers, and the acid copolymers on which ionomers are based, are disclosed, for example, in U.S. Pat. Nos. 3,264,272, and 4,351,931, and U.S. Patent Application Publication No. 2002/0013413.

Suitable high molecular weight organic acids, for both the metal salt and as a component of the ester plasticizer, are aliphatic organic acids, aromatic organic acids, saturated monofunctional organic acids, unsaturated monofunctional organic acids, multi-unsaturated monofunctional organic acids, and dimerized derivatives thereof. Particular examples of suitable organic acids include, but are not limited to, caproic acid, caprylic acid, capric acid, lauric acid, stearic acid, behenic acid, erucic acid, oleic acid, linoleic acid, myristic acid, benzoic acid, palmitic acid, phenylacetic acid, naphthalenoic acid, dimerized derivatives thereof, and combinations thereof. Salts of high molecular weight organic acids comprise the salts, particularly the barium, lithium, sodium, zinc, bismuth, chromium, cobalt, copper, potassium, strontium, titanium, tungsten, magnesium, and calcium salts, of aliphatic organic acids, aromatic organic acids, saturated monofunctional organic acids, unsaturated monofunctional organic acids, multi-unsaturated monofunctional organic acids, dimerized derivatives thereof, and combinations thereof. Suitable organic acids and salts thereof are more fully described, for example, in U.S. Pat. No. 6,756,436, the entire disclosure of which is hereby incorporated herein by reference. In a particular embodiment, the HNP composition comprises an organic acid salt in an amount of 20 phr or greater, or 25 phr or greater, or 30 phr or greater, or 35 phr or greater, or 40 phr or greater.

The plasticized HNP compositions of the present invention optionally contain one or more melt-flow modifiers. The amount of melt-flow modifier in the composition is readily determined such that the melt-flow index of the composition is at least 0.1 g/10 min, preferably from 0.5 g/10 min to 10.0 g/10 min, and more preferably from 1.0 g/10 min to 6.0 g/10 min, as measured using ASTM D-1238, condition E, at 190° C., using a 2160 gram weight.

It is not required that a conventional melt-flow modifier be added to the plasticized HNP composition of this invention. Such melt-flow modifiers are optional. If a melt-flow modifier is added, it may be selected from the group of traditional melt-flow modifiers including, but not limited to, the high molecular weight organic acids and salts thereof disclosed above, polyamides, polyesters, polyacrylates, polyurethanes, polyethers, polyureas, polyhydric alcohols, and combinations thereof. Also suitable are the non-fatty acid melt-flow modifiers disclosed in U.S. Pat. Nos. 7,365,128 and 7,402,629, the entire disclosures of which are hereby incorporated herein by reference. However, as discussed above, certain plasticizers are added to the composition of this invention, and it is recognized that such plasticizers may modify the melt-flow of the composition in some instances.

The plasticized HNP compositions of the present invention optionally include additive(s) and/or filler(s) in an amount within a range having a lower limit of 0 or 5 or 10 wt %, and an upper limit of 15 or 20 or 25 or 30 or 50 wt %, based on the total weight of the composition. Suitable additives and fillers include, but are not limited to, chemical blowing and foaming agents, optical brighteners, coloring agents, fluorescent agents, whitening agents, UV absorbers, light stabilizers, defoaming agents, processing aids, mica, talc, nano-fillers, antioxidants, stabilizers, softening agents, fragrance components, impact modifiers, $TiO_2$, acid copolymer wax, surfactants, and fillers, such as zinc oxide, tin oxide, barium sulfate, zinc sulfate, calcium oxide, calcium carbonate, zinc carbonate, barium carbonate, clay, tungsten, tungsten carbide, silica, lead silicate, regrind (recycled material), and mixtures thereof. Suitable additives are more fully disclosed, for example, in U.S. Patent Application Publication No. 2003/0225197, the entire disclosure of which is hereby incorporated herein by reference.

In some embodiments, the plasticized HNP composition is a "moisture resistant" HNP composition, i.e., having a moisture vapor transmission rate ("MVTR") of 8 g-mil/100 in$^2$/day or less (i.e., 3.2 g-mm/m$^2$·day or less), or 5 g-mil/100 in$^2$/day or less (i.e., 2.0 g-mm/m$^2$·day or less), or 3 g-mil/100 in$^2$/day or less (i.e., 1.2 g-mm/m$^2$·day or less), or 2 g-mil/100 in$^2$/day or less (i.e., 0.8 g-mm/m$^2$·day or less), or 1 g-mil/100 in$^2$/day or less (i.e., 0.4 g-mm/m$^2$·day or less), or less than 1 g-mil/100 in$^2$/day (i.e., less than 0.4 g-mm/m$^2$·day). Suitable moisture resistant HNP compositions are disclosed, for example, in U.S. Patent Application Publication Nos. 2005/0267240, 2006/0106175, and 2006/0293464, the entire disclosures of which are hereby incorporated herein by reference.

The plasticized HNP compositions of the present invention are not limited by any particular method or any particular equipment for making the compositions. In a preferred embodiment, the composition is prepared by the following process. The acid copolymer(s), plasticizers, optional melt-flow modifier(s), and optional additive(s)/filler(s) are simultaneously or individually fed into a melt extruder, such as a single or twin screw extruder. Other suitable methods for incorporating the plasticizer into the composition are described further below. A suitable amount of cation source is then added such that at least 70%, or at least 80%, or at least 90%, or at least 95%, or at least 100%, of all acid groups present are neutralized. Optionally, the cation source is added in an amount sufficient to neutralize, theoretically, 105% or greater, or 110% or greater, or 115% or greater, or 120% or greater, or 125% or greater, or 200% or greater, or 250% or greater of all acid groups present in the composition. The acid copolymer may be at least partially neutralized prior to the above process. The components are intensively mixed prior to being extruded as a strand from the die-head.

The HNP composition, which will be plasticized with specific plasticizers as described in detail below, optionally comprises at least one additional copolymer component selected from partially neutralized ionomers as disclosed, for example, in U.S. Patent Application Publication No. 2006/0128904, the entire disclosure of which is hereby incorporated herein by reference; bimodal ionomers, such as those disclosed in U.S. Patent Application Publication No. 2004/0220343 and U.S. Pat. Nos. 6,562,906, 6,762,246, 7,273,903, 8,193,283, 8,410,219, and 8,410,220, the entire disclosures of which are hereby incorporated herein by reference, and particularly Surlyn® AD 1043, 1092, 1022, and SEP 1856-1 ionomer resins, commercially available from E. I. du Pont de Nemours and Company; ionomers modified with rosins, such as those disclosed in U.S. Patent Application Publication No. 2005/0020741, the entire disclosure of which is hereby incorporated by reference; soft and resilient ethylene copolymers, such as those disclosed U.S. Patent Application Publication No. 2003/0114565, the entire disclosure of which is hereby incorporated herein by reference; polyolefins, such as linear, branched, or cyclic, $C_2$-$C_{40}$ olefins, particularly polymers comprising ethylene or propylene copolymerized with one or more $C_2$-$C_{40}$ olefins, $C_3$-$C_{20}$ α-olefins, or $C_3$-$C_{10}$ α-olefins; polyamides; polyesters; polyethers; polycarbonates; polysulfones; polyacetals; polylactones; acrylonitrile-butadiene-styrene resins; polyphenylene oxide; polyphenylene sulfide; styrene-acrylonitrile resins; styrene maleic anhydride; polyimides; aromatic polyketones; ionomers and ionomeric precursors, acid copolymers, and conventional HNPs, such as those disclosed in U.S. Pat. Nos. 6,756,436, 6,894,098, and 6,953,820, the entire disclosures of which are hereby incorporated herein by reference; polyurethanes; grafted and non-grafted metallocene-catalyzed polymers, such as single-site catalyst polymerized polymers, high crystalline acid polymers, cationic ionomers, and combinations thereof.

Other polymer components that may be included in the plasticized HNP composition include, for example, natural and synthetic rubbers, including, but not limited to, ethylene propylene rubber ("EPR"), ethylene propylene diene rubber ("EPDM"), styrenic block copolymer rubbers (such as SI, SIS, SB, SBS, SIBS, and the like, where "S" is styrene, "I" is isobutylene, and "B" is butadiene), butyl rubber, halobutyl rubber, copolymers of isobutylene and para-alkylstyrene, halogenated copolymers of isobutylene and para-alkylstyrene, natural rubber, polyisoprene, copolymers of butadiene with acrylonitrile, polychloroprene, alkyl acrylate rubber (such as ethylene-alkyl acrylates and ethylene-alkyl methacrylates, and, more specifically, ethylene-ethyl acrylate, ethylene-methyl acrylate, and ethylene-butyl acrylate), chlorinated isoprene rubber, acrylonitrile chlorinated isoprene rubber, and polybutadiene rubber (cis and trans). Additional suitable blend polymers include those described in U.S. Pat. No. 5,981,658, for example at column 14, lines 30 to 56, the entire disclosure of which is hereby incorporated herein by reference.

The blend may be produced by post-reactor blending, by connecting reactors in series to make reactor blends, or by using more than one catalyst in the same reactor to produce multiple species of polymer. The polymers may be mixed prior to being put into an extruder, or they may be mixed in an extruder. In a particular embodiment, the plasticized HNP composition comprises an acid copolymer and an additional polymer component, wherein the additional polymer component is a non-acid polymer present in an amount of greater than 50 wt %, or an amount within a range having a lower limit of 50 or 55 or 60 or 65 or 70 and an upper limit of 80 or 85 or 90, based on the combined weight of the acid copolymer and the non-acid polymer. In another particular embodiment, the plasticized HNP composition comprises an acid copolymer and an additional polymer component, wherein the additional polymer component is a non-acid polymer present in an amount of less than 50 wt %, or an amount within a range having a lower limit of 10 or 15 or 20 or 25 or 30 and an upper limit of 40 or 45 or 50, based on the combined weight of the acid copolymer and the non-acid polymer.

The plasticized HNP compositions of the present invention, in the neat (i.e., unfilled) form, preferably have a specific gravity of 0.90 g/cc to 1.00 g/cc, more preferably 0.95 g/cc to 0.99 g/cc. Any suitable filler, flake, fiber, particle, or the like, of an organic or inorganic material may be added to the HNP composition to increase or decrease the specific gravity, particularly to adjust the weight distribution within the golf ball, as further disclosed in U.S. Pat. Nos. 6,494,795, 6,547,677, 6,743,123, 7,074,137, and 6,688,991, the entire disclosures of which are hereby incorporated herein by reference. The term, "specific gravity" as used herein, has its ordinary and customary meaning, that is, the ratio of the density of a substance to the density of water at 4° C., and the density of water at this temperature is 1 g/cm³.

In one particular embodiment, the plasticized HNP composition is selected from the relatively "soft" HNP compositions disclosed in U.S. Pat. No. 7,468,006, the entire disclosure of which is hereby incorporated herein by reference, and the low modulus HNP compositions disclosed in U.S. Pat. No. 7,207,903, the entire disclosure of which is hereby incorporated herein by reference. In a particular aspect of this embodiment, a sphere formed from the HNP composition has a compression of 80 or less, or 70 or less, or 65 or less, or 60 or less, or 50 or less, or 40 or less, or 30 or less, or 20 or less. In another particular aspect of this embodiment, the plasticized HNP composition has a material hardness within a range having a lower limit of 40 or 50 or 55 Shore C and an upper limit of 70 or 80 or 87 Shore C, or a material hardness of 55 Shore D or less, or a material hardness within a range having a lower limit of 10 or 20 or 30 or 37 or 39 or 40 or 45 Shore D and an upper limit of 48 or 50 or 52 or 55 or 60 or 80 Shore D. In yet another particular aspect of this embodiment, the plasticized HNP composition comprises an HNP having a modulus within a range having a lower limit of 1,000 or 5,000 or 10,000 psi and an upper limit of 17,000 or 25,000 or 28,000 or 30,000 or 35,000 or 45,000 or 50,000 or 55,000 psi, as measured using a standard flex bar according to ASTM D790-B.

In a second particular embodiment, the plasticized HNP composition is selected from the relatively "hard" HNP compositions disclosed in U.S. Pat. No. 7,468,006, the entire disclosure of which is hereby incorporated herein by reference, and the high modulus HNP compositions disclosed in U.S. Pat. No. 7,207,903, the entire disclosure of which is hereby incorporated herein by reference. In a particular aspect of this embodiment, a sphere formed from the plasticized HNP composition has a compression of 70 or greater, or 80 or greater, or a compression within a range having a lower limit of 70 or 80 or 90 or 100 and an upper limit of 110 or 130 or 140. In another particular aspect of this embodiment, the HNP composition has a material hardness of 35 Shore D or greater, or 45 Shore D or greater, or a material hardness within a range having a lower limit of 45 or 48 or 50 or 55 or 57 or 58 or 60 or 65 or 70 or 75 Shore D and an upper limit of 75 or 80 or 85 or 90 or 95 Shore D. In yet another particular aspect of this embodiment, the plasticized HNP composition comprises an HNP having a modulus within a range having a lower limit of 25,000 or 27,000 or 30,000 or 40,000 or 45,000 or 50,000 or 55,000 or 60,000 psi and an upper limit of 72,000 or 75,000 or 100,000 or 150,000 psi, as measured using a standard flex bar according to ASTM D790-B. Suitable HNP compositions are further disclosed, for example, in U.S. Pat. Nos. 6,653,382, 6,756,436, 6,777,472, 6,815,480, 6,894,098, 6,919,393, 6,953,820, 6,994,638, 7,375,151, the entire disclosures of which are hereby incorporated herein by reference. Plasticizers, as described further below, are added to the above-described soft and hard and other HNP compositions.

In a particular embodiment, the HNP composition is formed by blending an acid copolymer, a non-acid polymer, a cation source, and a fatty acid or metal salt thereof. The resulting HNP composition is plasticized with a plasticizer as described further below. For purposes of the present invention, maleic anhydride modified polymers are defined herein as a non-acid polymer despite having anhydride groups that can ring-open to the acid form during processing of the polymer to form the HNP compositions herein. The maleic anhydride groups are grafted onto a polymer, are present at relatively very low levels, and are not part of the polymer backbone, as is the case with the acid polymers, which are exclusively E/X and E/X/Y copolymers of ethylene and an acid, particularly methacrylic acid and acrylic acid.

In a particular aspect of this embodiment, the acid copolymer is selected from ethylene-acrylic acid and ethylene-methacrylic acid copolymers, optionally containing a softening monomer selected from n-butyl acrylate, iso-butyl acrylate, and methyl acrylate. The acid copolymer preferably has an acid content with a range having a lower limit of 2 or 10 or 15 or 16 weight % and an upper limit of 20 or 25 or 26 or 30 weight %.

The non-acid polymer is preferably selected from the group consisting of polyolefins, polyamides, polyesters, polyethers, polyurethanes, metallocene-catalyzed polymers, single-site catalyst polymerized polymers, ethylene propylene rubber, ethylene propylene diene rubber, styrenic block copolymer rubbers, alkyl acrylate rubbers, and functionalized derivatives thereof.

In another particular aspect of this embodiment, the non-acid polymer is an elastomeric polymer. Suitable elastomeric polymers include, but are not limited to:

(a) ethylene-alkyl acrylate polymers, particularly polyethylene-butyl acrylate, polyethylene-methyl acrylate, and polyethylene-ethyl acrylate;

(b) metallocene-catalyzed polymers;

(c) ethylene-butyl acrylate-carbon monoxide polymers and ethylene-vinyl acetate-carbon monoxide polymers;

(d) polyethylene-vinyl acetates;

(e) ethylene-alkyl acrylate polymers containing a cure site monomer;

(f) ethylene-propylene rubbers and ethylene-propylene-diene monomer rubbers;

(g) olefinic ethylene elastomers, particularly ethylene-octene polymers, ethylene-butene polymers, ethylene-propylene polymers, and ethylene-hexene polymers;

(h) styrenic block copolymers;

(i) polyester elastomers;

(j) polyamide elastomers;

(k) polyolefin rubbers, particularly polybutadiene, polyisoprene, and styrene-butadiene rubber; and (l) thermoplastic polyurethanes.

Examples of particularly suitable commercially available non-acid polymers include, but are not limited to, Lotader® ethylene-alkyl acrylate polymers and Lotryl® ethylene-alkyl acrylate polymers, and particularly Lotader® 4210, 4603, 4700, 4720, 6200, 8200, and AX8900 commercially available from Arkema Corporation; Elvaloy® AC ethylene-alkyl acrylate polymers, and particularly AC 1224, AC 1335, AC 2116, AC3117, AC3427, and AC34035, commercially available from E. I. du Pont de Nemours and Company; Fusabond® elastomeric polymers, such as ethylene vinyl acetates, polyethylenes, metallocene-catalyzed polyethylenes, ethylene propylene rubbers, and polypropylenes, and particularly Fusabond® N525, C190, C250, A560, N416, N493, N614, P614, M603, E100, E158, E226, E265, E528, and E589, commercially available from E. I. du Pont de Nemours and Company; Honeywell A-C polyethylenes and ethylene maleic anhydride copolymers, and particularly A-C 5180, A-C 575, A-C 573, A-C 655, and A-C 395, commercially available from Honeywell; Nordel® IP rubber, Elite® polyethylenes, Engage® elastomers, and Amplify® functional polymers, and particularly Amplify® GR 207, GR 208, GR 209, GR 213, GR 216, GR 320, GR 380, and EA 100, commercially available from The Dow Chemical Company; Enable® metallocene polyethylenes, Exact® plastomers, Vistamaxx® propylene-based elastomers, and Vistalon® EPDM rubber, commercially available from ExxonMobil Chemical Company; Starflex® metallocene linear low density polyethylene, commercially available from LyondellBasell; Elvaloy® HP4051, HP441, HP661 and HP662 ethylene-butyl acrylate-carbon monoxide polymers and Elvaloy® 741, 742 and 4924 ethylene-vinyl acetate-carbon monoxide polymers, commercially available from E. I. du Pont de Nemours and Company; Evatane® ethylene-vinyl acetate polymers having a vinyl acetate content of from 18 to 42%, commercially available from Arkema Corporation; Elvax® ethylene-vinyl acetate polymers having a vinyl acetate content of from 7.5 to 40%, commercially available from E. I. du Pont de Nemours and Company; Vamac® G terpolymer of ethylene, methylacrylate and a cure site monomer, commercially available from E. I. du Pont de Nemours and Company; Vistalon® EPDM rubbers, commercially available from ExxonMobil Chemical Company; Kraton® styrenic block copolymers, and particularly Kraton® FG1901GT, FG1924GT, and RP6670GT, commercially available from Kraton Performance Polymers Inc.; Septon® styrenic block copolymers, commercially available from Kuraray Co., Ltd.; Hytrel® polyester elastomers, and particularly Hytrel® 3078, 4069, and 5556, commercially available from E. I. du Pont de Nemours and Company; Riteflex® polyester elastomers, commercially available from Celanese Corporation; Pebax® thermoplastic polyether block amides, and particularly Pebax® 2533, 3533, 4033, and 5533, commercially available from Arkema Inc.; Affinity® and Affinity® GA elastomers, Versify® ethylene-propylene copolymer elastomers, and Infuse® olefin block copolymers, commercially available from The Dow Chemical Company; Exxelor® polymer resins, and particularly Exxelor® PE 1040, PO 1015, PO 1020, VA 1202, VA 1801, VA 1803, and VA 1840, commercially available from ExxonMobil Chemical Company; and Royaltuf® EPDM, and particularly Royaltuf®498 maleic anhydride modified polyolefin based on an amorphous EPDM and Royaltuf®485 maleic anhydride modified polyolefin based on an semi-crystalline EPDM, commercially available from Chemtura Corporation.

In the plasticized HNP compositions, the acid copolymer and non-acid polymer are combined and reacted with a cation source, such that at least 80% of all acid groups present are neutralized. The resulting plasticized HNP composition also includes a plasticizer as described further below. The present invention is not meant to be limited by a particular order for combining and reacting the acid polymer, non-acid polymer and cation source. In a particular embodiment, the fatty acid or metal salt thereof is used in an amount such that the fatty acid or metal salt thereof is present in the HNP composition in an amount of from 10 wt % to 60 wt %, or within a range having a lower limit of 10 or 20 or 30 or 40 wt % and an upper limit of 40 or 50 or 60 wt %, based on the total weight of the HNP composition. Suitable cation sources and fatty acids and metal salts thereof are further disclosed above.

In another particular aspect of this embodiment, the acid copolymer is an ethylene-acrylic acid copolymer having an acid content of 19 wt % or greater, the non-acid polymer is a metallocene-catalyzed ethylene-butene copolymer, optionally modified with maleic anhydride, the cation source is magnesium, and the fatty acid or metal salt thereof is magnesium oleate present in the composition in an amount of 20 to 50 wt %, based on the total weight of the composition. This preferred HNP composition is treated with a plasticizer as described further below.

As discussed above, the ethylene acid copolymer may be blended with other materials including, but not limited to, partially- and fully-neutralized ionomers optionally blended with a maleic anhydride-grafted non-ionomeric polymer, graft copolymers of ionomer and polyamide, and the following non-ionomeric polymers, including homopolymers and copolymers thereof, as well as their derivatives that are compatibilized with at least one grafted or copolymerized functional group, such as maleic anhydride, amine, epoxy, isocyanate, hydroxyl, sulfonate, phosphonate, and the like. Other suitable materials that may be blended with the ethylene acid copolymer include, for example the following polymers (including homopolymers, copolymers, and derivatives thereof):

(a) polyesters, particularly those modified with a compatibilizing group such as sulfonate or phosphonate, including modified poly(ethylene terephthalate), modified poly(butylene terephthalate), modified poly(propylene terephthalate), modified poly(trimethylene terephthalate), modified poly(ethylene naphthenate), and those disclosed in U.S. Pat. Nos. 6,353,050, 6,274,298, and 6,001,930, the entire disclosures of which are hereby incorporated herein by reference, and blends of two or more thereof;

(b) polyamides, polyamide-ethers, and polyamide-esters, and those disclosed in U.S. Pat. Nos. 6,187,864, 6,001,930, and 5,981,654, the entire disclosures of which are hereby incorporated herein by reference, and blends of two or more thereof;

(c) polyurethanes, polyureas, polyurethane-polyurea hybrids, and blends of two or more thereof;

(d) fluoropolymers, such as those disclosed in U.S. Pat. Nos. 5,691,066, 6,747,110 and 7,009,002, the entire disclosures of which are hereby incorporated herein by reference, and blends of two or more thereof;

(e) non-ionomeric acid polymers, such as E/X- and E/X/Y-type polymers, wherein E is an olefin (e.g., ethylene), X is a carboxylic acid such as acrylic, methacrylic, crotonic, maleic, fumaric, or itaconic acid, and Y is a softening comonomer such as vinyl esters of aliphatic carboxylic acids wherein the acid has from 2 to 10 carbons, alkyl ethers wherein the alkyl group has from 1 to 10 carbons, and alkyl alkylacrylates such as alkyl methacrylates wherein the alkyl group has from 1 to 10 carbons; and blends of two or more thereof;

(f) metallocene-catalyzed polymers, such as those disclosed in U.S. Pat. Nos. 6,274,669, 5,919,862, 5,981,654, and 5,703,166, the entire disclosures of which are hereby incorporated herein by reference, and blends of two or more thereof;

(g) polystyrenes, such as poly(styrene-co-maleic anhydride), acrylonitrile-butadiene-styrene, poly(styrene sulfonate), polyethylene styrene, and blends of two or more thereof;

(h) polypropylenes and polyethylenes, particularly grafted polypropylene and grafted polyethylenes that are modified with a functional group, such as maleic anhydride of sulfonate, and blends of two or more thereof;

(i) polyvinyl chlorides and grafted polyvinyl chlorides, and blends of two or more thereof;

(j) polyvinyl acetates, preferably having less than about 9% of vinyl acetate by weight, and blends of two or more thereof;

(k) polycarbonates, blends of polycarbonate/acrylonitrile-butadiene-styrene, blends of polycarbonate/polyurethane, blends of polycarbonate/polyester, and blends of two or more thereof;

(l) polyvinyl alcohols, and blends of two or more thereof;

(m) polyethers, such as polyarylene ethers, polyphenylene oxides, block copolymers of alkenyl aromatics with vinyl aromatics and poly(amic esters), and blends of two or more thereof;

(n) polyimides, polyetherketones, polyamideimides, and blends of two or more thereof;

(o) polycarbonate/polyester copolymers and blends; and (p) combinations of any two or more of the above thermoplastic polymers.

Suitable ionomeric compositions comprise one or more acid polymers, each of which is partially- or fully-neutralized, and optionally additives, fillers, and/or melt-flow modifiers. Suitable acid polymers are salts of homopolymers and copolymers of α,β-ethylenically unsaturated mono- or dicarboxylic acids, and combinations thereof, optionally including a softening monomer, and preferably having an acid content (prior to neutralization) of from 1 wt % to 30 wt %, more preferably from 5 wt % to 20 wt %. The acid polymer is preferably neutralized to 70% or higher, including up to 100%, with a suitable cation source, such as metal cations and salts thereof, organic amine compounds, ammonium, and combinations thereof. Preferred cation sources are metal cations and salts thereof, wherein the metal is preferably lithium, sodium, potassium, magnesium, calcium, barium, lead, tin, zinc, aluminum, manganese, nickel, chromium, copper, or a combination thereof.

Suitable additives and fillers include, for example, blowing and foaming agents, optical brighteners, coloring agents, fluorescent agents, whitening agents, UV absorbers, light stabilizers, defoaming agents, processing aids, mica, talc, nanofillers, antioxidants, stabilizers, softening agents, fragrance components, impact modifiers, acid copolymer wax, surfactants; inorganic fillers, such as zinc oxide, titanium dioxide, tin oxide, calcium oxide, magnesium oxide, barium sulfate, zinc sulfate, calcium carbonate, zinc carbonate, barium carbonate, mica, talc, clay, silica, lead silicate, and the like; high specific gravity metal powder fillers, such as tungsten powder, molybdenum powder, and the like; regrind, i.e., core material that is ground and recycled; and nano-fillers. Suitable melt-flow modifiers include, for example, fatty acids and salts thereof, polyamides, polyesters, polyacrylates, polyurethanes, polyethers, polyureas, polyhydric alcohols, and combinations thereof.

Suitable ionomeric compositions include blends of highly neutralized polymers (i.e., neutralized to 70% or higher) with partially neutralized ionomers as disclosed, for example, in U.S. Patent Application Publication No. 2006/0128904, the entire disclosure of which is hereby incorporated herein by reference. Suitable ionomeric compositions also include blends of one or more partially- or fully-neutralized polymers with additional thermoplastic and thermoset materials, including, but not limited to, non-ionomeric acid copolymers, engineering thermoplastics, fatty acid/salt-based highly neutralized polymers, polybutadienes, polyurethanes, polyureas, polyesters, polycarbonate/polyester blends, thermoplastic elastomers, maleic anhydride-grafted metallocene-catalyzed polymers, and other conventional polymeric materials. Suitable ionomeric compositions are further disclosed, for example, in U.S. Pat. Nos. 6,653,382, 6,756,436, 6,777,472, 6,894,098, 6,919,393, and 6,953,820, the entire disclosures of which are hereby incorporated herein by reference.

Examples of commercially available thermoplastics suitable for forming cover layers of golf balls disclosed herein include, but are not limited to, Pebax® thermoplastic polyether block amides, commercially available from Arkema Inc.; Surlyn® ionomer resins, Hytrel® thermoplastic polyester elastomers, and ionomeric materials sold under the trade names DuPont® HPF 1000 and HPF 2000, and HPF AD 1035, HPF AD 1035 Soft, HPF AD 1040, and HPF AD 1172, all of which are commercially available from E. I. du Pont de Nemours and Company; Iotek® ionomers, commercially available from ExxonMobil Chemical Company; Amplify® IO ionomers of ethylene acrylic acid copolymers, commercially available from The Dow Chemical Company; Clarix® ionomer resins, commercially available from A. Schulman Inc.; Elastollan® polyurethane-based thermoplastic elastomers, commercially available from BASF; and Xylex® polycarbonate/polyester blends, commercially available from SABIC Innovative Plastics.

In a particular embodiment, the plasticized thermoplastic cover composition comprises a material selected from the group consisting of partially- and fully-neutralized ionomers optionally blended with a maleic anhydride-grafted non-ionomeric polymer, polyesters, polyamides, polyethers, and blends of two or more thereof and plasticizer.

In another particular embodiment, the plasticized thermoplastic cover composition is a blend of two or more ionomers and plasticizer. In a particular aspect of this embodiment, the thermoplastic composition is a 50 wt %/50 wt % blend of two different partially-neutralized ethylene/methacrylic acid polymers.

In another particular embodiment, the plasticized thermoplastic cover composition is a blend of one or more ionomers and a maleic anhydride-grafted non-ionomeric polymer and plasticizer. In a particular aspect of this embodiment, the non-ionomeric polymer is a metallocene-catalyzed polymer. In another particular aspect of this embodiment, the ionomer is a partially-neutralized ethylene/methacrylic acid polymer and the non-ionomeric polymer is a maleic anhydride-grafted metallocene-catalyzed polymer. In another particular aspect of this embodiment, the ionomer is a partially-neutralized ethylene/methacrylic acid polymer and the non-ionomeric polymer is a maleic anhydride-grafted metallocene-catalyzed polyethylene.

As discussed above, in one preferred embodiment, at least 70% of the acid groups in the acid copolymer are neutralized, and these materials are referred to as HNP materials herein. However, it is understood that other acid copolymer compositions may be used in accordance with the present invention. For example, acid copolymer compositions having acid groups that are neutralized from about 20% to about less than 70% may be used, and these materials may be referred to as partially-neutralized ionomers. For example, the partially-neutralized ionomers may have a neutralization level of about 30% to about 65%, and more particularly about 35% to 60%.

Preferred ionomers are salts of O/X- and O/X/Y-type acid copolymers, wherein O is an $\alpha$-olefin, X is a $C_3$-$C_8$ $\alpha,\beta$-ethylenically unsaturated carboxylic acid, and Y is a softening monomer. O is preferably selected from ethylene and propylene. X is preferably selected from methacrylic acid, acrylic acid, ethacrylic acid, crotonic acid, and itaconic acid. Methacrylic acid and acrylic acid are particularly preferred. Y is preferably selected from (meth) acrylate and alkyl (meth) acrylates wherein the alkyl groups have from 1 to 8 carbon atoms, including, but not limited to, n-butyl (meth) acrylate, isobutyl (meth) acrylate, methyl (meth) acrylate, and ethyl (meth) acrylate.

Preferred O/X and O/X/Y-type copolymers include, without limitation, ethylene acid copolymers, such as ethylene/(meth)acrylic acid, ethylene/(meth)acrylic acid/maleic anhydride, ethylene/(meth)acrylic acid/maleic acid mono-ester, ethylene/maleic acid, ethylene/maleic acid mono-ester, ethylene/(meth)acrylic acid/n-butyl (meth)acrylate, ethylene/(meth)acrylic acid/iso-butyl (meth)acrylate, ethylene/(meth)acrylic acid/methyl (meth)acrylate, ethylene/(meth) acrylic acid/ethyl (meth)acrylate terpolymers, and the like. The term, "copolymer," as used herein, includes polymers having two types of monomers, those having three types of monomers, and those having more than three types of monomers. Preferred $\alpha$, $\beta$-ethylenically unsaturated mono- or dicarboxylic acids are (meth) acrylic acid, ethacrylic acid, maleic acid, crotonic acid, fumaric acid, itaconic acid. (Meth) acrylic acid is most preferred. As used herein, "(meth) acrylic acid" means methacrylic acid and/or acrylic acid. Likewise, "(meth) acrylate" means methacrylate and/or acrylate.

The O/X or O/X/Y-type copolymer is at least partially neutralized with a cation source. Suitable cation sources include, but are not limited to, metal ion sources, such as compounds of alkali metals, alkaline earth metals, transition metals, and rare earth elements; ammonium salts and monoamine salts; and combinations thereof. Preferred cation sources are compounds of magnesium, sodium, potassium, cesium, calcium, barium, manganese, copper, zinc, lead, tin, aluminum, nickel, chromium, lithium, and rare earth metals.

Also, as discussed above, it is recognized that the cation source is optional, and non-neutralized or lowly-neutralized compositions may be used. For example, acid copolymers having 0% to less than 20% neutralization levels may be used. Acid copolymer compositions containing plasticizers and having zero percent of the acid groups neutralized may be used per this invention. Also, acid copolymer ionomer compositions containing plasticizers, wherein 1 to 19% of the acid groups are neutralized, may be used. Particularly, acid copolymers having about 3% to about 18% and more particularly about 6% to about 15% neutralization levels may be used in accordance with this invention.

It is also recognized that acid copolymer blends may be prepared including, but not limited to, acid copolymer compositions formed from: i) blends of two or more partially-neutralized ionomers; ii) blends of two or more highly-neutralized ionomers; iii) blends of two or more non-neutralized acid copolymers and/or lowly-neutralized ionomers; iv) blends of one or more highly-neutralized ionomers with one or more partially-neutralized ionomers, and/or lowly-neutralized ionomers, and/or non-neutralized acid copolymers; v) blends of partially-neutralized ionomers with one or more highly-neutralized ionomers, and/or lowly-neutralized ionomers, and/or non-neutralized acid copolymers.

Plasticizers for Making Thermoplastic Compositions

As discussed above, the ethylene acid copolymer compositions of this invention contain a plasticizer. Adding the plasticizers helps to reduce the glass transition temperature (Tg) of the composition. The glass transition in a polymer is a temperature range below which a polymer is relatively brittle and above which it is rubber-like. In addition to lowering the Tg, the plasticizer may also reduce the tanδ in the temperature range above the Tg. The Tg of a polymer is measured by a Differential Scanning calorimeter or a Dynamic Mechanical Analyzer (DMA) and the DMA is used to measure tanδ. The plasticizer may also reduce the hardness and compression of the composition when compared to its non-plasticized condition. The effects of adding a plasticizer to the ethylene acid copolymer composition on Tg, flex modulus, hardness, and other physical properties are discussed further below.

The ethylene acid copolymer compositions may contain one or more plasticizers. The plasticizers that may be used in the ethylene acid copolymer compositions of this invention include, for example, N-butylbenzenesulfonamide (BBSA); N-ethylbenzenesulfonamide (EBSA); N-propyl-benzenesulfonamide (PBSA); N-butyl-N-dodecylbenzene-sulfonamide (BDBSA); N,N-dimethylbenzenesulfonamide (DMBSA); p-methylbenzenesulfonamide; o,p-toluene sulfonamide; p-toluene sulfonamide; 2-ethylhexyl-4-hydroxybenzoate; hexadecyl-4-hydroxybenzoate; 1-butyl-4-hydroxybenzoate; dioctyl phthalate; diisodecyl phthalate; di-(2-ethylhexyl) adipate; and tri-(2-ethylhexyl) phosphate; and blends thereof.

In one preferred version, the plasticizer is selected from the group of polytetramethylene ether glycol (available from BASF under the tradename, PolyTHF™ 250); propylene carbonate (available from Huntsman Corp., under the tradename, Jeffsol™ PC); and/or dipropyleneglycol dibenzoate (available from Eastman Chemical under the tradename, Benzoflex™ 284). Mixtures of these plasticizers also may be used.

Other suitable plasticizer compounds include benzene mono-, di-, and tricarboxylic acid esters. Phthalates such as Bis(2-ethylhexyl) phthalate (DEHP), Diisononyl phthalate (DINP), Di-n-butyl phthalate (DnBP, DBP), Butyl benzyl phthalate (BBP), Diisodecyl phthalate (DIDP), Dioctyl phthalate (DnOP), Diisooctyl phthalate (DIOP), Diethyl phthalate (DEP), Diisobutyl phthalate (DIBP), and Di-n-hexyl phthalate, and blends thereof are suitable. Iso- and terephthalates such as Dioctyl terephthalate and Dinonyl isophthalate may be used. Also appropriate are trimellitates such as Trimethyl trimellitate (TMTM), Tri-(2-ethylhexyl) trimellitate (TOTM™), Tri-(n-octyl,n-decyl) trimellitate, Tri-(heptyl,nonyl) trimellitate, Tri-n-octyl trimellitate; as well as benzoates, including: 2-ethylhexyl-4-hydroxy benzoate, n-octyl benzoate, methyl benzoate, and ethyl benzoate, and blends thereof Also suitable are alkyl diacid esters commonly based on C4-C12 alkyl dicarboxylic acids such as adipic, sebacic, azelaic, and maleic acids such as: Bis(2-ethylhexyl)adipate (DEHA), Dimethyl adipate (DMAD), Monomethyl adipate (MMAD), Dioctyl adipate (DOA), Dibutyl sebacate (DBS), Dibutyl maleate (DBM), Diisobutyl maleate (DIBM), Dioctyl sebacate (DOS), and blends thereof. Also, esters based on glycols, polyglycols and polyhydric alcohols such as poly (ethylene glycol) mono- and di-esters, cyclohexanedimethanol esters, sorbitol derivatives; and triethylene glycol dihexanoate, diethylene glycol di-2-ethylhexanoate, tetraethylene glycol diheptanoate, and ethylene glycol dioleate, and blends thereof may be used.

Fatty acids, fatty acid salts, fatty acid amides, and fatty acid esters also may be used in the compositions of this invention. Compounds such as stearic, oleic, ricinoleic, behenic, myristic, linoleic, palmitic, and lauric acid esters, salts, and mono- and bis-amides can be used. Ethyl oleate, butyl stearate, methyl acetylricinoleate, zinc oleate, ethylene bis-oleamide, and stearyl erucamide are suitable. Suitable fatty acid salts include, for example, metal stearates, erucates, laurates, oleates, palmitates, pelargonates, and the like. For example, fatty acid salts such as zinc stearate, calcium stearate, magnesium stearate, barium stearate, and the like can be used. Fatty alcohols and acetylated fatty alcohols are also suitable, as are carbonate esters such as propylene carbonate and ethylene carbonate. Mixtures of any of the plasticizers described herein also may be used in accordance with this invention. In a particularly preferred version, the fatty acid ester is an alkyl oleate selected from the group consisting of methyl, propyl, ethyl, butyl, octyl, and decyl oleates. For example, in one version, ethyl oleate is used as the plasticizer. In another version, butyl oleate or octyl oleate is used in the composition. Suitable commercially-available fatty acids include, for example, SylFat™ FA2 Tall Fatty Acid, available from Arizona Chemical. The fatty acid composition includes 2% saturated, 50% oleic, 37% linoleic (non-conjugated), and 7% linoleic (conjugated) fatty acids; and 4% other fatty acids. This fatty acid typically has an acid value in the range of 195 to 205 mg KOH/gm.

Glycerol-based esters such as soy-bean, tung, or linseed oils or their epoxidized derivatives or blends thereof can also be used as plasticizers in the present invention, as can polymeric polyester plasticizers formed from the esterification reaction of diacids and diglycols as well as from the ring-opening polymerization reaction of caprolactones with diacids or diglycols. Citrate esters and acetylated citrate esters are also suitable. Glycerol mono-, di-, and tri-oleates may be used per this invention, and in one preferred embodiment, glycerol trioleate is used as the plasticizer.

Dicarboxylic acid molecules containing both a carboxylic acid ester and a carboxylic acid salt can perform suitably as plasticizers. The magnesium salt of mono-methyl adipate and the zinc salt of mono-octyl glutarate are two such examples for this invention. Tri- and tetra-carboxylic acid esters and salts can also be used.

Also envisioned as suitable plasticizers are organophosphate and organosulfur compounds such as tricresyl phosphate (TCP), tributyl phosphate (TBP), octyldiphenyl phosphate, alkyl sulfonic acid phenyl esters (ASE); and blends thereof; and sulfonamides such as N-ethyl toluene sulfonamide,N-(2-hydroxypropyl) benzene sulfonamide, N-(n-butyl) benzene sulfonamide. Furthermore, thioester and thioether variants of the plasticizer compounds mentioned above are suitable.

Non-ester plasticizers such as alcohols, polyhydric alcohols, glycols, polyglycols, and polyethers also are suitable materials for plasticization. Materials such as polytetramethylene ether glycol, poly(ethylene glycol), and poly(propylene glycol), oleyl alcohol, and cetyl alcohol can be used. Hydrocarbon compounds, both saturated and unsaturated, linear or cyclic can be used such as mineral oils, microcrystalline waxes, or low-molecular weight polybutadiene. Halogenated hydrocarbon compounds can also be used.

Other examples of plasticizers that may be used in the ethylene acid copolymer composition of this invention include butylbenzenesulphonamide (BBSA), ethylhexyl para-hydroxybenzoate (EHPB) and decylhexyl para-hydroxybenzoate (DHPB), as disclosed in Montanari et al., U.S. Pat. No. 6,376,037, the disclosure of which is hereby incorporated by reference.

Esters and alkylamides such as phthalic acid esters including dimethyl phthalate, diethyl phthalate, dibutyl phthalate, diheptyl phthalate, di-2-ethylhexyl phthalate, di-n-octyl phthalate, diisodecyl phthalate, ditridecyl phthalate, dicyclohexyl phthalate, butylbenzyl phthalate, diisononyl phthalate, ethylphthalylethyl glycolate, butylphthalylbutyl glycolate, diundecyl phthalate, di-2-ethylhexyl tetrahydrophthalate as disclosed in Isobe et al., U.S. Pat. No. 6,538,099, the disclosure of which is hereby incorporated by reference, also may be used.

Jacques et al., U.S. Pat. No. 7,045,185, the disclosure of which is hereby incorporated by reference, discloses sulphonamides such as N-butylbenzenesulphonamide, ethyltoluene-sulphonamide, N-cyclohexyltoluenesulphonamide, 2-ethylhexyl-para-hydroxybenzoate, 2-decylhexyl-para-hydroxybenzoate, oligoethyleneoxytetrahydrofurfuryl alcohol, or oligoethyleneoxy malonate; esters of hydroxybenzoic acid; esters or ethers of tetrahydrofurfuryl alcohol, and esters of citric acid or hydroxymalonic acid; and these plasticizers also may be used.

Sulfonamides also may be used in the present invention, and these materials are described in Fish, Jr. et al., U.S. Pat. No. 7,297,737, the disclosure of which is hereby incorporated by reference. Examples of such sulfonamides include N-alkyl benzenesulfonamides and toluenesufonamides, particularly N-butylbenzenesulfonamide, N-(2-hydroxypropyl) benzenesulfonamide, N-ethyl-o-toluenesulfonamide, N-ethyl-p-toluenesulfonamide, o-toluenesulfonamide, p-toluenesulfonamide. Such sulfonamide plasticizers also are described in Hochstetter et al., US Patent Application Publication 2010/0183837, the disclosure of which is hereby incorporated by reference.

As noted above, the fatty acid esters are particularly preferred plasticizers in the present invention. It has been found that the fatty acid esters perform well as plasticizers in the ethylene acid copolymer composition. The fatty acid esters have several advantageous properties. For example, the fatty acid esters are compatible with the ethylene acid copolymers and they tend to blend uniformly and completely with the acid copolymer. Also, the fatty acid esters tend to improve the resiliency and/or compression of the composition as discussed further below. The ethylene acid copolymer/plasticizer compositions may contain other ingredients that do not materially affect the basic and novel characteristics of the composition. For example, mineral fillers may be added as discussed above. In one particular version, the composition consists essentially of ethylene acid copolymer and plasticizer, particularly a fatty acid ester. In another particular version, the composition consists essentially of ethylene acid copolymer, cation source sufficient to neutralize at least 20% of the acid groups present in the composition, and plasticizer, particularly a fatty acid ester.

One method of preparing the fatty acid ester involves reacting the fatty acid or mixture of fatty acids with a corresponding alcohol. The alcohol can be any alcohol including, but not limited to, linear, branched, and cyclic alcohols. The fatty acid ester is commonly a methyl, ethyl, propyl, butyl, octyl, or other alkyl ester of a carboxylic acid that contains from 4 to 30 carbon atoms. In the present invention, ethyl, butyl, octyl, and decyl esters and particularly ethyl oleate, butyl oleate, and octyl oleate are preferred fatty acid esters because of their properties. The carboxylic acid may be saturated or unsaturated. Examples of suitable saturated carboxylic acids, that is, carboxylic acids in which the carbon atoms of the alkyl chain are connected by single bonds, include but are not limited to butyric acid (chain length of $C_4$ and molecular weight of 88.1); capric acid ($C_{10}$ and MW of 172.3); lauric acid ($C_{12}$ and MW of 200.3); myristic acid ($C_{14}$ and MW of 228.4); palmitic acid ($C_{16}$ and MW of 256.4); stearic acid ($C_{18}$ and MW of 284.5); and behenic acid ($C_{22}$ and MW of 340.6). Examples of suitable unsaturated carboxylic acids, that is, a carboxylic acid in which there is one or more double bonds between the carbon atoms in the alkyl chain, include but are not limited to oleic acid (chain length and unsaturation C18:1; and MW of 282.5); linoleic acid (C18:2 and MW of 280.5; linolenic acid (C18:3 and MW of 278.4); and erucic acid (C22:1 and MW of 338.6).

It is believed that the plasticizer should be added in a sufficient amount to the ethylene acid copolymer composition so there is a substantial change in the stiffness and/or hardness of the ethylene acid copolymer. Thus, although the concentration of plasticizer may be as little as 1% by weight to form some ethylene acid copolymer compositions per this invention, it is preferred that the concentration be relatively greater. For example, it is preferred that the concentration of the plasticizer be at least 3 weight percent (wt. %). More particularly, it is preferred that the plasticizer be present in an amount within a range having a lower limit of 1% or 3% or 5% or 7% or 8% or 10% or 12% or 15% or 18% and an upper limit of 20% or 22% or 25% or 30% or 35% or 40% or 42% or 50% or 55% or 60% or 66% or 71% or 75% or 80%. In one preferred embodiment, the concentration of plasticizer falls within the range of about 7% to about 75%, preferably about 9% to about 55%, and more preferably about 15% to about 50%.

It is believed that adding the plasticizer to the ethylene acid copolymer helps make the composition softer and more rubbery. Adding the plasticizers to the composition helps decrease the stiffness of the composition. That is, the plasticizer helps lower the flex modulus of the composition. The flex modulus refers to the ratio of stress to strain within the elastic limit (when measured in the flexural mode) and is similar to tensile modulus. This property is used to indicate the bending stiffness of a material. The flexural modulus, which is a modulus of elasticity, is determined by calculating the slope of the linear portion of the stress-strain curve during the bending test. If the slope of the stress-strain curve is relatively steep, the material has a relatively high flexural modulus meaning the material resists deformation. The material is more rigid. If the slope is relatively flat, the material has a relatively low flexural modulus meaning the material is more easily deformed. The material is more flexible. The flex modulus can be determined in accordance with ASTM D790 standard among other testing procedures. Thus, in one embodiment, the first ethylene acid copolymer (containing ethylene acid copolymer only) composition has a first flex modulus value and the second ethylene acid copolymer (containing ethylene acid copolymer and plasticizer) composition has a second flex modulus value, wherein the second flex modulus value is at least 1% less; or at least 2% less; or at least 4% less; or at least 8% less; or at least 10% less than the first modulus value.

Plasticized thermoplastic compositions of the present invention are not limited by any particular method or any particular equipment for making the compositions. In a preferred embodiment, the composition is prepared by the following process. The acid copolymer(s), plasticizer, optional melt-flow modifier(s), and optional additive(s)/filler(s) are simultaneously or individually fed into a melt extruder, such as a single or twin screw extruder. If the acid polymer is to be neutralized, a suitable amount of cation source is then added to achieve the desired level of neutralization neutralized. The acid polymer may be partially or fully neutralized prior to the above process. The components are intensively mixed prior to being extruded as a strand from the die-head. Additional methods for incorporating plasticizer into the thermoplastic compositions herein are disclosed in co-pending U.S. patent application Ser. No. 13/929,841, as well as in U.S. Pat. Nos. 8,523,708 and 8,523,709, which are fully incorporated by reference herein.

More particularly, in one embodiment, the ethylene acid copolymer/plasticizer composition has a flex modulus lower limit of about 500 (or less), 1,000, 1,600, 2,000, 4,200, 7,500, 9,000, 10,000 or 20,000 or 40,000 or 50,000 or 60,000 or 70,000 or 80,000 or 90,000 or 100,000; and a flex modulus upper limit of about 110,000 or 120,000 or 130,000 psi or 140,000 or 160,000 or 180,000 or 200,000 or 300,000 or greater. In general, the properties of flex modulus and hardness are related, whereby flex modulus measures the material's resistance to bending, and hardness measures the material's resistance to indentation. In general, as the flex modulus of the material increases, the hardness of the material also increases. As discussed above, adding the plasticizer to the ethylene acid copolymer helps reduce the flex modulus of the composition and it also helps reduce hardness to a certain degree. Thus, in one embodiment, the ethylene acid copolymer/plasticizer composition is relatively soft and having a hardness of no greater than 40 Shore D or no greater than 55 Shore C. For example, the Shore D hardness may be within a range having a lower limit of 5 or 8 or 10 or 12 or 14 and an upper limit of 28 or 30 or 32 or 34 or 35 or 38 or 40 Shore D. The Shore C hardness may be within the range having a lower limit of 10 or 13 or 15 or 17 or 19 and an upper limit of 44 or 46 or 48 or 50 or 53 or 55 Shore C. In other embodiments, the ethylene acid copolymer/plasticizer composition is moderately soft having a hardness of no greater than about 60 Shore D or no greater than 75 Shore C. For example, the Shore D hardness may be within a range having a lower limit of 25, 28, 20, 32, 35, 36, 38, or 40, and an upper limit of 42, 45, 48, 50, 54, 56, or 60. The Shore C hardness may be within the range of having a lower limit of 30, 33, 35, 37, 39, 41, or 43, and an upper limit of 62, 64, 66, 68, 71, 73 or 75 Shore C. In yet other embodiments, the ethylene acid copolymer/plasticizer composition is moderately hard having a hardness no greater than 95 Shore D or no greater than 99C. For example, the Shore D hardness may be within the range having a lower limit of about 42, 44, 47, 48, 51, 53, or 58 and an upper limit of about 60, 65, 72, 77, 80, 84, 91, or 95 Shore D. The Shore C hardness may be within the range having a lower limit of 57, 59, 62, 66, or 72 and an upper limit of about 75, 78, 84, 87, 90, 93, 95, 97, or 99 Shore C.

It also is believed that adding the plasticizer to the ethylene acid copolymer composition helps reduce the glass transition temperature (Tg) of the composition in many instances. Thus, in one embodiment, the first ethylene acid copolymer (containing ethylene acid copolymer only) composition has a first Tg value and the second ethylene acid copolymer (containing ethylene acid copolymer and plasticizer) composition has a second Tg value, wherein the second Tg value is at least 1 degree (1°) less; or at least 2° less; or at least 4° less; or at least 8°; or at least 10° less than the first Tg value. In other embodiments, the first Tg value and the second Tg value are approximately the same.

In addition, introducing the specific plasticizers of this invention into the ethylene acid copolymer composition generally helps to reduce the compression and/or increase the COR of the composition (when molded into a solid sphere and tested) versus a non-plasticized composition (when molded into a solid sphere and tested.) Plasticized ethylene acid copolymer compositions typically show compression values lower, or at most equal to, non-plasticized compositions while the plasticized compositions display COR values that may be higher, or at the least equal to, non-plasticized compositions. This effect is surprising, because in many conventional compositions, the compression of the composition increases as the COR increases. In some instances plasticization of the composition might produce a slight reduction in the COR while at the same time reducing the compression to a greater extent, thereby providing an overall improvement to the compression/COR relationship over the non-plasticized composition.

More particularly, referring to FIG. 1, the Coefficient of Restitution (CoR) of some sample spheres made of ethylene acid copolymer compositions of this invention are plotted against the Compression of the samples. The samples were 1.55" injection-molded spheres aged two weeks at 23° C./50% RH. In FIG. 1, the 'High-Performance Commercial HNP Index" (also referred to as "Soft and Fast Index (SFI) in the Examples/Tables below) is constructed from the properties of commercially-available highly neutralized polymers (HNP) with good resilience-to-hardness and -compression relationships, e.g., HPF AD1035, HPF AD1035Soft, and HPF2000. These ethylene acid copolymers are highly neutralized (about 90% or greater neutralization levels). In particular, the compositions described in the following Index Table were used to construct the Index. In FIG. 1, the plot shows resiliency versus compression only. But, there are similar relationships between resiliency and hardness; and Shore C and Shore D hardness values for various samples are reported in the Examples/Tables below.

| Index Table | | | | |
|---|---|---|---|---|
| Example | Solid Sphere COR | Solid Sphere Compression | Solid Sphere Shore D Hardness | Solid Sphere Shore C Hardness |
| HPF AD1035 | 0.822 | 63 | 41.7 | 70.0 |
| HPF AD1035 Soft | 0.782 | 35 | 35.6 | 59.6 |
| HPF 2000 | 0.856 | 91 | 46.1 | 76.5 |
| HPF AD1172 | 0.785 | 25 | — | — |
| HPF 1000 | 0.831 | 114 | 51.5 | 84.8 |

HPF AD1035 - acid copolymer ionomer resin, available from the DuPont Company.
HPF AD1035 Soft - acid copolymer ionomer resin, available from the DuPont Company.
HPF 2000 - acid copolymer ionomer resin, available from the DuPont Company.
HPF AD1172 - acid copolymer ionomer resin, available from the DuPont Company.
HPF 1000 - acid copolymer ionomer resin, available from the DuPont Company.

As shown in the Index Line of FIG. 1, the CoR of the HPF samples generally decreases as the Compression of the Samples decreases. This relationship between the CoR and Compression in spheres made from conventional ethylene acid copolymer ionomers, as demonstrated by the Index, is generally expected. Normally, the resiliency of a ball decreases as the compression of the ball decreases.

Turning to Line A in FIG. 1, the following highly neutralized ethylene acid copolymer (HNP) compositions are plotted. These ethylene acid copolymers are highly neutralized (about 90% or greater neutralization levels).

TABLE A

HPF Compositions

| Example | Solid Sphere COR | Solid Sphere Compression | Solid Sphere Shore D Hardness | Solid Sphere Shore C Hardness |
|---|---|---|---|---|
| HPF 2000 | 0.856 | 91 | 46.1 | 76.5 |
| HPF 2000 with 10% EO (90/10) | 0.839 | 68 | 37.9 | 68.8 |
| HPF 2000 with 20% EO (80/20) | 0.810 | 32 | 30.2 | 53.0 |
| HPF 2000 with 30% EO (70/30) | 0.768 | −12 | 22.7 | 39.4 |
| HPF 1000 with 10% EO (90/10) | 0.846 | 99 | 47.2 | 81.2 |

EO—ethyl oleate (plasticizer)

As expected, the resiliency of the samples comprising Line A generally decreases as the compression decreases. However, when comparing Line A to the Index, there are some interesting and surprising relationships to note. First, each different embodiment of a plasticized composition of this invention (HPF 2000 with EO samples indicated as points on Line A) has a higher absolute CoR versus the corresponding point on the Index at a given compression. (See, for example, the point for Sample HPF 2000 with 10% EO versus the corresponding point on the Index). Thus, these samples made from plasticized compositions of this invention show a greater absolute resiliency than samples made from conventional materials at a given compression. Having this relatively high resiliency is an advantageous feature. In general, a core with higher resiliency will reach a higher velocity when struck by a golf club and travel longer distances. The "feel" of the ball also is important and this generally refers to the sensation that a player experiences when striking the ball with the club. The feel of a ball is a difficult property to quantify. Most players prefer balls having a soft feel, because the player experience a more natural and comfortable sensation when their club face makes contact with these balls. The feel of the ball primarily depends upon the hardness and compression of the ball.

Secondly, there is an Index value calculated for each of the sample points in Line A. The Index value is calculated by subtracting the CoR value of the sample point on Line A from the corresponding point on the Index Line at a given compression. (The Index value can be a positive or negative number.) As shown, the Index value increases as the CoR and Compression of the samples decrease (i.e., moving from right to left along Line A). For instance the Index value is greater for the HPF 2000 with 30% EO sample than the Index values for the HPF2000 with 20% and 10% EO samples. The slope of Line A is less than the slope of the Index. Thus, the "drop-off" in CoR for a sample as the Compression decreases for the samples in Line A is less than the "drop-off" for the samples in the Index.

Figure 2:
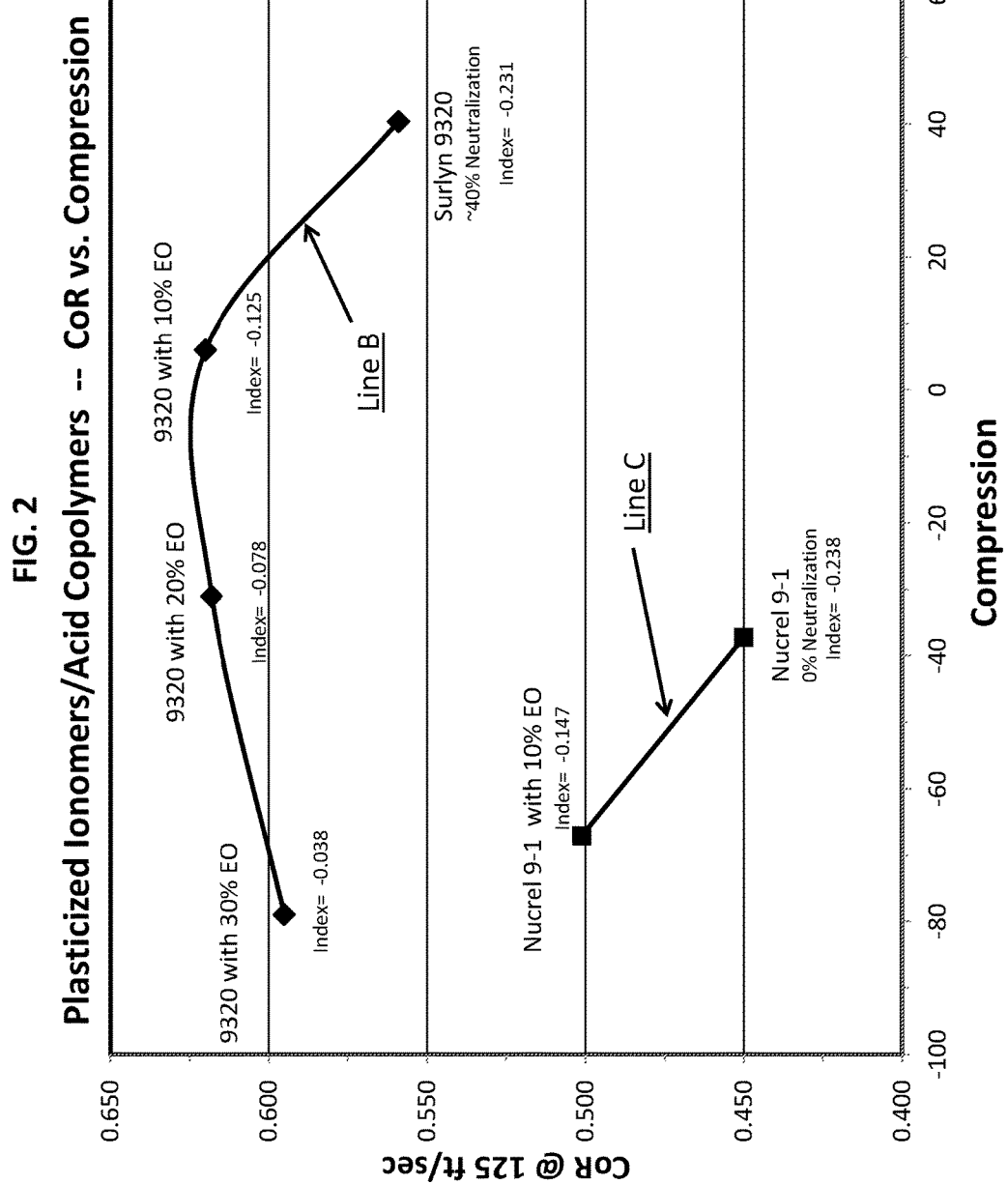
FIG. 2 is a graph showing the Coefficient of Restitution (COR) of additional commercially-available samples and ethylene acid copolymer/plasticizer samples of this invention plotted against the Compression of the respective samples.

Next, in Line B of FIG. 2, the following ethylene acid copolymer ionomer compositions are plotted. These ethylene acid copolymers are partially neutralized (about 40% neutralization levels).

TABLE B

Surlyn 9320 Compositions

| Example | Solid Sphere COR | Solid Sphere Compression | Solid Sphere Shore D Hardness | Solid Sphere Shore C Hardness |
|---|---|---|---|---|
| Surlyn 9320 | 0.559 | 40 | 37.2 | 62.1 |
| Surlyn 9320 with 10% EO (90/10) | 0.620 | 6 | 26.3 | 45.8 |
| Surlyn 9320 with 20% EO (80/20) | 0.618 | −31 | 24.9 | 38.4 |
| Surlyn 9320 with 30% EO (70/30) | 0.595 | −79 | 18.7 | 28.0 |

Surlyn 9320 is based on a copolymer of ethylene with 23.5% n-butyl acrylate and about 9% methacrylic acid that is about 41% neutralized with a zinc cation source, available from the DuPont Company.
EO—ethyl oleate (plasticizer)

Interestingly, there is an increase in the resiliency of the first sample point comprising Line B (Surlyn 9320 with 10% EO) versus the control point of Line B (Surlyn 9320) as the compression decreases. And, the resiliency of the first and second sample points (Surlyn 9320 with 10% EO and Surlyn 9320 with 20% EO) is approximately the same as the compression decreases. Although each different embodiment of a plasticized composition of this invention (Surlyn 9320 with EO samples indicated as points on Line B) has a lower absolute CoR versus the corresponding point on the Index at a given compression, the Index values for Line B are significant and need to be considered. The Index value is calculated by subtracting the CoR value of the sample point on Line B from the corresponding point on the Index Line at a given compression. (The Index value can be a positive or negative number.)

Particularly, the Index values along Line B increase as the Compression of the samples decrease (moving from right to left along the graph.) For instance the Index value is greater for the Surlyn with 30% EO sample than the Index values for the Surlyn with 20% EO and 10% EO samples. Significantly, the Index value for the unmodified Surlyn 9320 sample (non-plasticizer containing) is less than the Index value for the Surlyn 9320 with 10% EO sample (plasticizer containing). These greater Index values show the improved properties of the samples of this invention. A material made according to this invention is considered to be improved if its Index number (value) is greater than the Index number (value) of the control material (unmodified state) whether or not the material's absolute CoR is greater than the CoR of the control material.

Lastly, in Line C of FIG. 2, the following ethylene acid copolymer compositions are plotted. These ethylene acid copolymers are non-neutralized (0% neutralization levels).

TABLE C

Nucrel 9-1 Compositions

| Example | Solid Sphere COR | Solid Sphere Compression | Solid Sphere Shore D Hardness | Solid Sphere Shore C Hardness |
|---|---|---|---|---|
| Nucrel 9-1 | 0.449 | −37 | 23.2 | 40.3 |
| Nucrel 9-1 with 10% EO (90/10) | 0.501 | −67 | 19.1 | 26.3 |

Nucrel 9-1: is a copolymer of ethylene with 23.5% n-butyl acrylate, and about 9% methacrylic acid that is non-neutralized, available from the DuPont Company.
EO—ethyl oleate (plasticizer)

Like the plotted compositions in Line B, there is an increase in the resiliency of the first sample point comprising Line C (Nucrel 9-1 with 10% EO) versus the control point of Line C (Nucrel 9-1) as the compression decreases. Also, the Nucrel 9-1 with 10% EO sample has a lower absolute CoR versus the corresponding point on the Index at a given compression. However, similar to the Index values of Line B, the Index values along Line C increase as the compression of the samples decrease (moving from right to left along the graph.) The Index value is calculated by subtracting the CoR value of the sample point on Line C from the corresponding point on the Index Line at a given compression. (The Index value can be a positive or negative number.)

These greater Index values show the improved properties of the samples of this invention. As discussed above, a material made according to this invention is considered to have been improved if its Index number (value) is greater than the Index number (value) of the control material (unmodified state) whether or not the material's absolute CoR has increased over the CoR of the control material.

As demonstrated by the plot in FIG. 1, the addition of a fatty acid ester plasticizer (ethyl oleate) to an acid copolymer or ionomer, makes that polymer faster (i.e., higher CoR) at a given compression (or a given hardness) versus the polymer without plasticizer. This allows the creation of materials that are faster and softer than commercially-available polymers. This is very important for golf ball layers, where ball speed (i.e., CoR) is needed for distance, but where feel (softness or low compression) is also highly desirable to most golfers. The ability to make a softer, better feeling golf ball that has higher CoR than predicted is surprising and highly beneficial.

Figure 3:
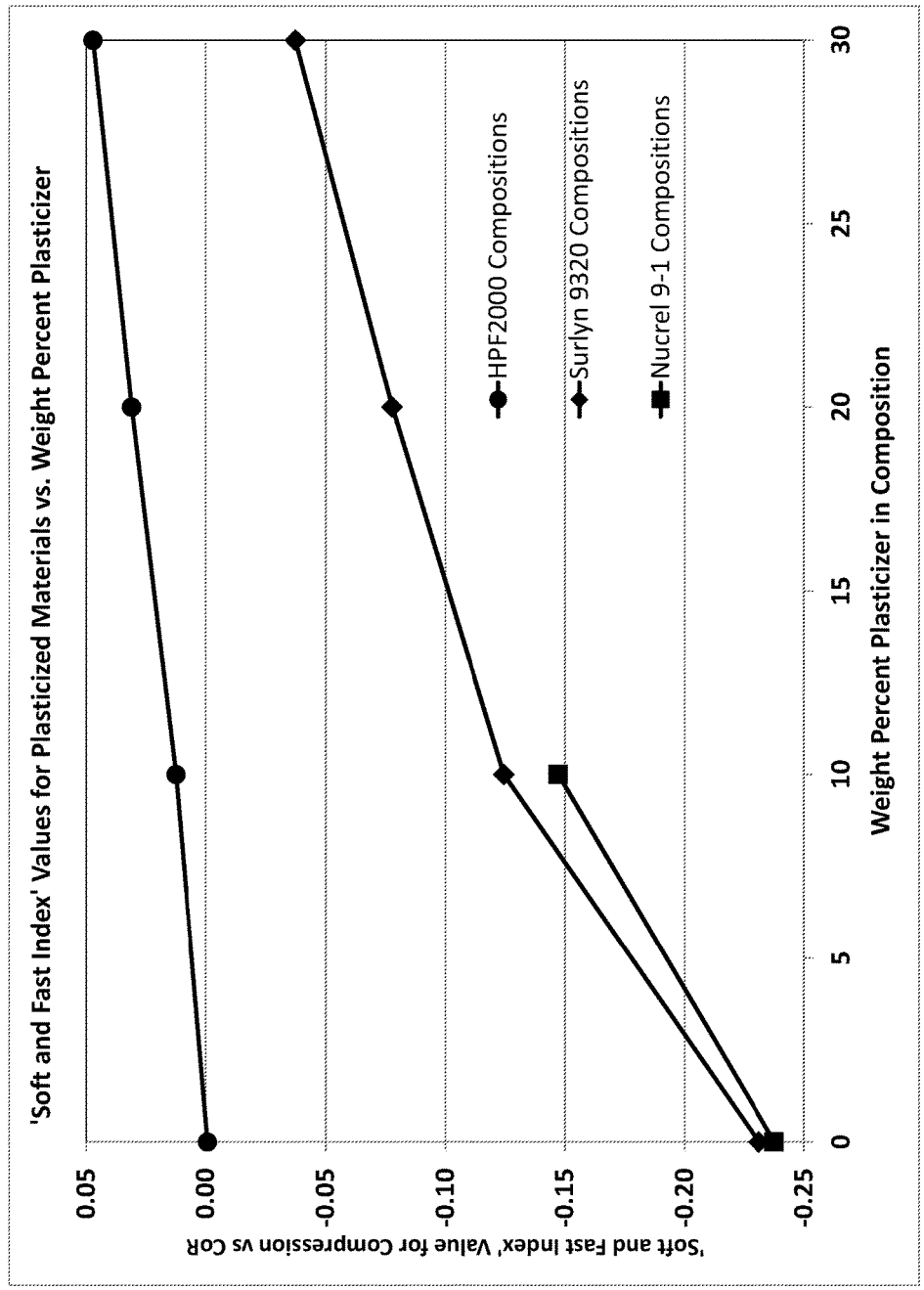
FIG. 3 is a graph showing the Soft and Fast Index (SFI) values for the ethylene acid copolymer/plasticizer samples plotted in FIGS. 1 and 2 plotted against the concentration of plasticizer in the respective compositions.

Referring to FIG. 3, the Soft and Fast Index (SFI) values for the plasticized thermoplastic compositions shown in FIGS. 1 and 2 (plasticized HPF 2000, Surlyn 9320, and Nucrel 9-1) are plotted against the concentration (weight percent) of plasticizer in the composition. As demonstrated by the plot in FIG. 3, the SFI values increase for each of the sample compositions as the concentration of plasticizer increases. The benefits of having high SFI values are discussed above. The plasticized thermoplastic compositions of this invention can be used to make cores having an optimum combination of properties including high resiliency and a soft and comfortable feel.

Cover Structure

The golf ball cores of this invention may be enclosed with one or more cover layers. For example, a golf ball having inner and outer cover layers may be made. In another version, a three-layered cover comprising inner, intermediate, and outer cover layers may be made. The multi-layered cover of the golf balls of this invention provide the ball with a variety of advantageous mechanical and playing performance properties as discussed further below. In general, the hardness and thickness of the different cover layers may vary depending upon the desired ball construction. In addition, as discussed above, an intermediate layer may be disposed between the core and cover layers. The cover layers preferably have good impact durability, toughness, and wear-resistance. The ethylene acid copolymer/plasticizer compositions of this invention may be used to form at least one of the cover layers.

In one version, the golf ball includes a multi-layered cover comprising inner and outer cover layers. The inner cover layer may be formed from a composition comprising an ionomer or a blend of two or more ionomers that helps impart hardness to the ball. In a particular embodiment, the inner cover layer is formed from a composition comprising a high acid ionomer. A particularly suitable high acid ionomer is Surlyn 8150® (DuPont). Surlyn 8150® is a copolymer of ethylene and methacrylic acid, having an acid content of 19 wt %, which is 45% neutralized with sodium. In another particular embodiment, the inner cover layer is formed from a composition comprising a high acid ionomer and a maleic anhydride-grafted non-ionomeric polymer. A particularly suitable maleic anhydride-grafted polymer is Fusabond 525D® (DuPont). Fusabond 525D® is a maleic anhydride-grafted, metallocene-catalyzed ethylene-butene copolymer having about 0.9 wt % maleic anhydride grafted onto the copolymer. A particularly preferred blend of high acid ionomer and maleic anhydride-grafted polymer is an 84 wt %/16 wt % blend of Surlyn 8150® and Fusabond 525D®. Blends of high acid ionomers with maleic anhydride-grafted polymers are further disclosed, for example, in U.S. Pat. Nos. 6,992,135 and 6,677,401, the entire disclosures of which are hereby incorporated herein by reference.

The inner cover layer also may be formed from a composition comprising a 50/45/5 blend of Surlyn® 8940/Surlyn® 9650/Nucrel® 960, and, in a particularly preferred embodiment, the composition has a material hardness of from 80 to 85 Shore C. In yet another version, the inner cover layer is formed from a composition comprising a 50/25/25 blend of Surlyn® 8940/Surlyn® 9650/Surlyn® 9910, preferably having a material hardness of about 90 Shore C. The inner cover layer also may be formed from a composition comprising a 50/50 blend of Surlyn® 8940/Surlyn® 9650, preferably having a material hardness of about 86 Shore C. A composition comprising a 50/50 blend of Surlyn® 8940 and Surlyn® 7940 also may be used. Surlyn® 8940 is an E/MAA copolymer in which the MAA acid groups have been partially neutralized with sodium ions. Surlyn® 9650 and Surlyn® 9910 are two different grades of E/MAA copolymer in which the MAA acid groups have been partially neutralized with zinc ions. Nucrel® 960 is an E/MAA copolymer resin nominally made with 15 wt % methacrylic acid.

When the inner cover layer is formed from one of the above-described ionomer or other compositions, the outer cover is preferably formed of the plasticized thermoplastic composition of this invention as described above.

In another version, the inner cover layer is formed from the plasticized thermoplastic composition of this invention, and the outer cover layer is formed from a suitable thermoset or thermoplastic composition.

Also, when more than one thermoplastic layer is used in the golf ball, the thermoplastic composition in the respective layers may be the same or different, and the composition may have the same or different hardness values. For example, a dual-layered cover assembly may be made, wherein the inner cover layer comprises a first thermoplastic composition, and the outer cover layer comprises a second thermoplastic composition. The first and second compositions may be the same, or the respective compositions may be different. For instance, the plasticized thermoplastic of this invention may be used in one or both cover layers. Preferably, the plasticized thermoplastic composition of this invention is used to form at least one cover layer. Likewise, when more than one thermoset layer is used in the golf ball, the thermoset composition in the respective layers may be the same or different, and the composition may have the same or different hardness values. Furthermore, in some examples, the thermoplastic material in a particular thermoplastic layer may constitute two, three, or more "sub-layers" of the same or different thermoplastic composition. That is, each thermoplastic layer can be formed from one or more sub-layers of the same or different thermoplastic material. In such instances, the thermoplastic layer can be considered a composite layer made of multiple independent and distinct component layers. Preferably, at least one of the component layers comprises the plasticized thermoplastic composition of this invention.

In addition to the plasticized thermoplastic composition of this invention, other suitable materials that can be used to form the outer cover layer include, for example, polyurethanes; polyureas; copolymers, blends and hybrids of polyurethane and polyurea; olefin-based copolymer ionomer resins (for example, Surlyn® ionomer resins and DuPont HPF® 1000, HPF® 2000, and HPF® 1035; and HPF® AD 1172, commercially available from DuPont; Iotek® ionomers, commercially available from ExxonMobil Chemical Company; Amplify® IO ionomers of ethylene acrylic acid copolymers, commercially available from The Dow Chemical Company; and Clarix® ionomer resins, commercially available from A. Schulman Inc.); polyethylene, including, for example, low density polyethylene, linear low density polyethylene, and high density polyethylene; polypropylene; rubber-toughened olefin polymers; acid copolymers, for example, poly(meth)acrylic acid, which do not become part of an ionomeric copolymer; plastomers; flexomers; styrene/butadiene/styrene block copolymers; styrene/ethylene-butylene/styrene block copolymers; dynamically vulcanized elastomers; copolymers of ethylene and vinyl acetates; copolymers of ethylene and methyl acrylates; polyvinyl chloride resins; polyamides, poly(amide-ester) elastomers, and graft copolymers of ionomer and polyamide including, for example, Pebax® thermoplastic polyether block amides, commercially available from Arkema Inc; cross-linked trans-polyisoprene and blends thereof; polyester-based thermoplastic elastomers, such as Hytrel®, commercially available from DuPont or RiteFlex®, commercially available from Ticona Engineering Polymers; polyurethane-based thermoplastic elastomers, such as Elastollan®, commercially available from BASF; synthetic or natural vulcanized rubber; and combinations thereof. Castable polyurethanes, polyureas, and hybrids of polyurethanes-polyureas are particularly desirable because these materials can be used to make a golf ball having high resiliency and a soft feel. By the term, "hybrids of polyurethane and polyurea," it is meant to include copolymers and blends thereof.

Polyurethanes, polyureas, and blends, copolymers, and hybrids of polyurethane/polyurea are also particularly suitable. When used as the outer cover layer material, polyurethanes and polyureas can be thermoset or thermoplastic. Thermoset materials can be formed into golf ball layers by conventional casting or reaction injection molding techniques. Thermoplastic materials can be formed into golf ball layers by conventional compression or injection molding techniques.

In one particularly preferred version, a two-layered cover is made. For example, a cover assembly having inner and outer cover layers, wherein a relatively hard cover is disposed about a relatively soft cover may be made. Alternatively, a relatively soft cover may be disposed about a relatively hard cover. The ethylene acid copolymer/plasticizer compositions of this invention may be used to form at least one of the cover layers. Other thermoplastic or thermoset compositions as described above may be used to form the other cover layer in the two-layered cover assembly. Suitable hardness ranges for the inner and outer cover layers are described below.

In another particularly preferred version, a three-layered cover is made. For example, a cover assembly having inner and outer cover layers, wherein an intermediate cover layer is disposed between the inner and outer cover layers, may be prepared. In such a construction, the ethylene acid copolymer/plasticizer compositions of this invention may be used to form at least one of the inner, intermediate, or outer cover layers.

In one version, the inner cover layer hardness is about 15 Shore D or greater, more preferably about 25 Shore D or greater, and most preferably about 35 Shore D or greater. For example, the inner cover layer hardness may be in the range of about 15 to about 60 Shore D, and more preferably about 27 to about 48 Shore D. In another version, the inner cover layer hardness is about 50 Shore D or greater, preferably about 55 Shore D or greater, and most preferably about 60 Shore D or greater. For example, in one version, the inner cover has a Shore D hardness of about 55 to about 90 Shore D. In another embodiment, the inner cover has a Shore D hardness of about 60 to about 78 Shore D, and in yet another version, the inner cover has a Shore D hardness of about 64 to about 72 Shore D. More particularly, in one example, the inner cover has a hardness of about 65 Shore D or greater. The hardness of the inner cover layer is measured per the methods described further below. In addition, the thickness of the inner cover layer is preferably about 0.015 inches to about 0.100 inches, more preferably about 0.020 inches to about 0.080 inches, and most preferably about 0.030 inches to about 0.050 inches. Typically, the thickness of the inner cover is about 0.035 or 0.040 or 0.045 inches.

In one version, the intermediate cover layer preferably has a material hardness of 70 Shore D or less, or 65 Shore D or less, or 60 Shore D or less, or 55 Shore D or less. Preferably, the intermediate cover has a Shore D hardness in the range of about 25 Shore D to about 60 Shore D, more preferably about 38 to about 50 Shore D. In other embodiments, however, the intermediate cover has a hardness of greater than 70 Shore D, for example, 75 Shore D or greater. Also, the thickness of the intermediate cover layer is preferably about equal to or greater than the thickness of the outer cover layer. More particularly, the thickness of the inner cover layer is preferably about 0.005 inches to about 0.040 inches, more preferably about 0.010 inches to about 0.035 inches, and most preferably about 0.015 inches to 0.030 inches.

Concerning the outer cover layer, this layer may be relatively thin. The outer cover preferably has a thickness within a range having a lower limit of 0.004 or 0.006 or 0.008 and an upper limit of 0.010 or 0.020 or 0.030 or 0.040 inches. Preferably, the thickness of the outer cover is about 0.016 inches or less, more preferably 0.008 inches or less. The outer cover preferably has a material hardness of 80 Shore D or less, or 70 Shore D or less, or 60 Shore D or less, or 55 Shore D or less, or 50 Shore D or less, or 45 Shore D or less. In one example, the outer cover preferably has Shore D hardness in the range of about 45 to about 80, more preferably about 55 to about 75. For example, the outer cover may have a Shore D hardness of 48 to 71 Shore D. In another example, the outer cover preferably has Shore D hardness in the range of about 10 to about 70, more preferably about 15 to about 60. The hardness of the outer cover layer is measured per the methods described further below.

The hardness of a cover layer may be measured on the surface or midpoint of the given layer in a manner similar to measuring the hardness of a core layer as described further below. For example, the hardness of the inner cover layer may be measured at the surface or midpoint of the layer. A midpoint hardness measurement is preferably made for the inner and intermediate cover layers. The midpoint hardness of a cover layer is taken at a point equidistant from the inner surface and outer surface of the layer to be measured. Once one or more cover or other ball layers surround a layer of interest, the exact midpoint may be difficult to determine, therefore, for the purposes of the present invention, the measurement of "midpoint" hardness of a layer is taken within plus or minus 1 mm of the measured midpoint of the layer. A surface hardness measurement is preferably made for the outer cover layer. In these instances, the hardness is measured on the outer surface (cover) of the ball. Methods for measuring the hardness are described in detail below under "Test Methods."

The relationship between the various cover layers is important in the construction of the golf ball of this invention. For example, in one embodiment, the plasticized thermoplastic composition of this invention is used to form the intermediate cover layer, and the hardness of the inner cover is greater than the hardness of the intermediate cover layer, preferably by at least 5 Shore D units. Meanwhile, the outer cover layer hardness is greater than the intermediate cover layer hardness, preferably by at least 5 Shore D Units.

In a second embodiment, the plasticized thermoplastic composition is used to form the intermediate cover layer, and the hardness of the inner cover and intermediate cover layers is substantially the same. In this embodiment, both the inner cover and intermediate covers have a hardness that is greater than the outer cover layer hardness, preferably by at least 5 Shore D Units.

In a third embodiment, the inner cover layer hardness is greater than the intermediate (plasticized thermoplastic composition) and outer cover layer hardness, preferably by at least 5 Shore D units. In this embodiment, the intermediate and outer cover layers may have substantially the same hardness.

In a fourth embodiment, the plasticized thermoplastic composition is used to form the intermediate cover layer, and the hardness of the inner cover is less than the hardness of the intermediate cover layer, preferably by at least 5 Shore D units. Also, the intermediate cover layer hardness is greater than the outer cover layer hardness preferably by at least 5 Shore D Units.

In a fifth embodiment, the plasticized thermoplastic composition is used to form the intermediate cover layer, and the hardness of the inner cover and intermediate cover layers is substantially the same. Both the inner cover and intermediate covers have a hardness that is less than the outer cover layer hardness in this embodiment.

In a sixth embodiment, the inner cover layer hardness is less than the intermediate (plasticized thermoplastic composition) and outer cover layer hardness, preferably by at least 5 Shore D units. The intermediate and outer cover layers may have substantially the same hardness in this embodiment.

The compositions used to make any cover layer (for example, inner, intermediate, or outer cover layer) may contain a wide variety of fillers and additives to impart specific properties to the ball. For example, relatively heavy-weight and light-weight metal fillers such as, particulate; powders; flakes; and fibers of copper, steel, brass, tungsten, titanium, aluminum, magnesium, molybdenum, cobalt, nickel, iron, lead, tin, zinc, barium, bismuth, bronze, silver, gold, and platinum, and alloys and combinations thereof may be used to adjust the specific gravity of the ball. Other additives and fillers include, but are not limited to, optical brighteners, coloring agents, fluorescent agents, whitening agents, UV absorbers, light stabilizers, surfactants, processing aids, antioxidants, stabilizers, softening agents, fragrance components, plasticizers, impact modifiers, titanium dioxide, clay, mica, talc, glass flakes, milled glass, and mixtures thereof.

In an alternative version of a three-layered cover, the plasticized thermoplastic composition of this invention is used to form the inner cover layer. In yet another version, the plasticized thermoplastic composition is used to form the outer cover layer. Suitable thermoset and other thermoplastic compositions as described above may be used to form the other cover layers. The plasticized thermoplastic composition of this invention may be used to form one or more cover layers in accordance with this invention.

The different hardness and thickness levels of the cover layers provide the ball with high impact durability and cut-, shear- and tear-resistance levels. In addition, the multi-layered cover, in combination with the core layer, helps impart high resiliency to the golf balls. Preferably, the golf ball has a Coefficient of Restitution (CoR) of at least 0.750 and more preferably at least 0.800 (as measured per the test methods below.) The core of the golf ball generally has a compression in the range of about 50 to about 130 and more preferably in the range of about 70 to about 110 (as measured per the test methods below.) These properties allow players to generate greater ball velocity off the tee and achieve greater distance with their drives. At the same time, the cover layers provide a player with a more comfortable and natural feeling when striking the ball with a club. The ball is more playable and the ball's flight path can be controlled more easily.

Figure 4:
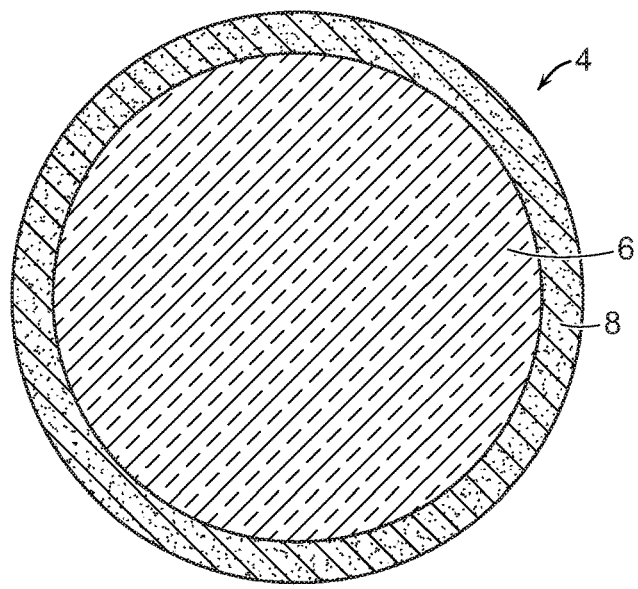
FIG. 4 is a cross-sectional view of a two-piece golf ball having a core and cover made in accordance with the present invention.
Figure 5:
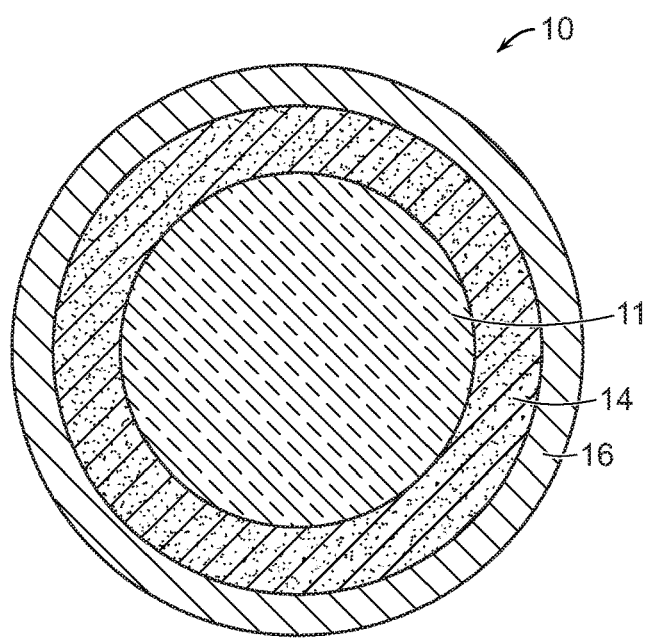
FIG. 5 is a cross-sectional view of a three-piece golf ball having a single-layered core and two-layered cover made in accordance with the present invention.
Figure 6:
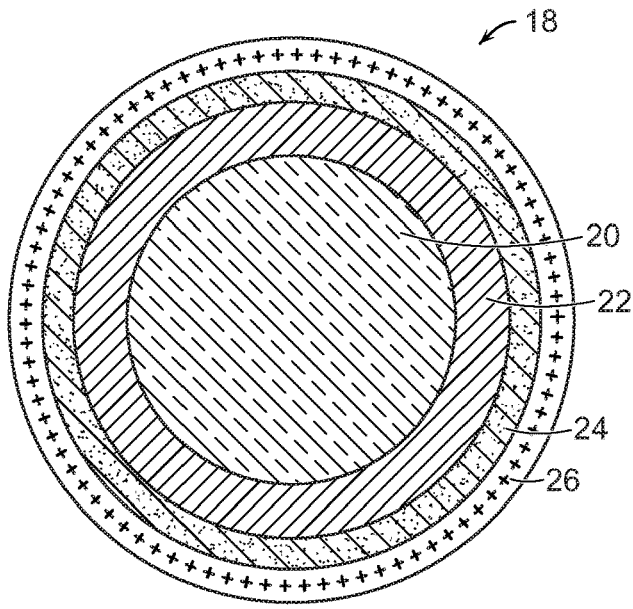
FIG. 6 is a cross-sectional view of a four-piece golf ball having a two-layered core and two-layered cover made in accordance with the present invention.
Figure 7:
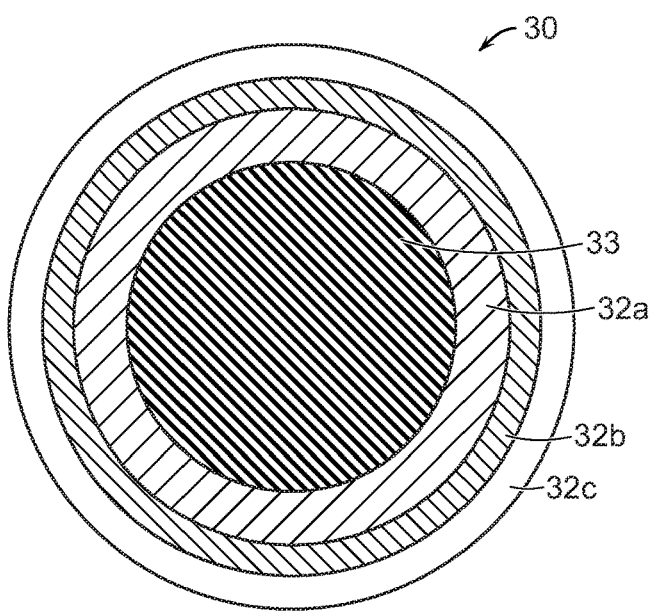
FIG. 7 is a cross-sectional view of a four-piece golf ball having a single-layered core and three-layered cover made in accordance with the present invention.
Figure 8:
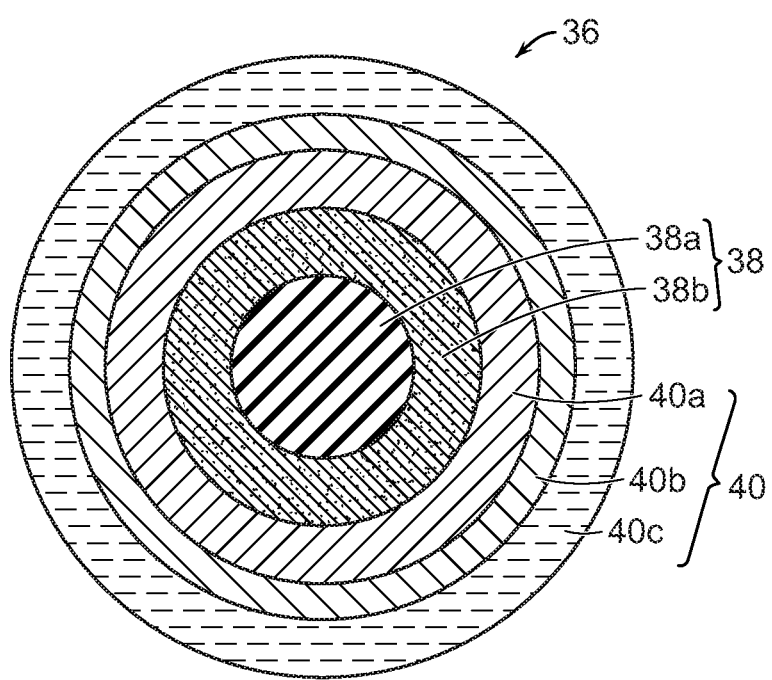
FIG. 8 is a cross-sectional view of a five-piece golf ball having a two-layered core and three-layered cover with inner, intermediate, and outer cover layers made in accordance with the present invention.

Referring to FIG. 4, a two-piece golf ball (4) comprising an inner core (center) (6) and an outer cover layer (8) is shown. Preferably, the outer cover comprises a plasticized thermoplastic composition of this invention. In another embodiment, a three-piece golf ball (10) is made, wherein the core (11) is surrounded by a two-layered cover (12) comprising an inner cover layer (14) and outer cover layer (16), may be made as shown in FIG. 5. A four-piece ball also can be made as shown in FIG. 6, wherein ball (18) contains a dual-core having an inner core (20) and outer core layer (22). The dual-core is surrounded by a multi-layered cover having an inner cover layer (24) and outer cover layer (26). Referring to FIG. 7, in another version, the four-piece golf ball (30) contains a multi-layered cover comprising inner cover layer (32a), intermediate cover layer (32b), and outer cover layer (32c) surrounding a solid, one-piece core (33). Turning to FIG. 8, the five-piece ball (36) includes a dual-core (38) comprising an inner core (center) (38a) and surrounding outer core layer (38b). The multi-layered cover (40) encapsulates the core structure (38) and includes inner (40a), intermediate (40b), and outer (40c) cover layers.

Different ball constructions can be made using the cover assembly of this invention as shown in FIGS. 4-8 discussed above. Such golf ball constructions include, for example, two-piece, three-piece, four-piece, five-piece, and six-piece constructions. It should be understood that the golf balls shown in FIGS. 4-8 are for illustrative purposes only, and they are not meant to be restrictive. Other golf ball constructions can be made in accordance with this invention.

Core Structure

The cover layers described above are disposed about a core assembly. Single-layer or multi-layer cores may be made. For example, a two-layered core having an inner core (center) and surrounding outer core layer may be made in accordance with this invention. In another example, a three-layered core having an inner core and outer core layer, wherein an intermediate core layer is disposed between the inner and outer core layers may be made. The plasticized thermoplastic compositions, which are described above as being suitable for making cover layers, are also suitable for forming the core layers. Thermoset rubber compositions and non-plasticized thermoplastic compositions also are suitable for making core layers in accordance with this invention In one preferred embodiment, the inner core (center) comprises a thermoplastic material and more preferably the plasticized thermoplastic material of this invention. In general, the plasticized thermoplastic composition comprises: a) an acid copolymer of ethylene and an $\alpha,\beta$-unsaturated carboxylic acid, optionally including a softening monomer selected from the group consisting of alkyl acrylates and methacrylates; and b) a plasticizer. In one preferred embodiment, a cation source is present in an amount sufficient to neutralize greater than 20% of all acid groups present in the composition. The composition may comprise a highly-neutralized polymer (HNP); partially-neutralized acid polymer; or lowly-neutralized or non-neutralized acid polymer, and blends thereof as described above. Suitable plasticizers that may be used to plasticize the thermoplastic compositions are also described above.

In another embodiment, the inner core comprises a thermoset material. Suitable thermoset materials that may be used to form the inner core include, but are not limited to, polybutadiene, polyisoprene, ethylene propylene rubber ("EPR"), ethylene-propylene-diene ("EPDM") rubber, styrene-butadiene rubber, styrenic block copolymer rubbers (such as "SI", "SIS", "SB", "SBS", "SIBS", and the like, where "S" is styrene, "I" is isobutylene, and "B" is butadiene), polyalkenamers such as, for example, polyoctenamer, butyl rubber, halobutyl rubber, polystyrene elastomers, polyethylene elastomers, polyurethane elastomers, polyurea elastomers, metallocene-catalyzed elastomers and plastomers, copolymers of isobutylene and p-alkylstyrene, halogenated copolymers of isobutylene and p-alkylstyrene, copolymers of butadiene with acrylonitrile, polychloroprene, alkyl acrylate rubber, chlorinated isoprene rubber, acrylonitrile chlorinated isoprene rubber, and blends of two or more thereof.

The thermoset rubber materials may be cured using a conventional curing process as described further below. Suitable curing processes include, for example, peroxide-curing, sulfur-curing, high-energy radiation, and combinations thereof. Preferably, the rubber composition contains a free-radical initiator selected from organic peroxides, high energy radiation sources capable of generating free-radicals, and combinations thereof.

Suitable thermoset rubber materials that may be used to form the core layers include, but are not limited to, polybutadiene, polyisoprene, ethylene propylene rubber ("EPR"), ethylene-propylene-diene ("EPDM") rubber, styrene-butadiene rubber, styrenic block copolymer rubbers (such as "SI", "SIS", "SB", "SBS", "SIBS", and the like, where "S" is styrene, "I" is isobutylene, and "B" is butadiene), polyalkenamers such as, for example, polyoctenamer, butyl rubber, halobutyl rubber, polystyrene elastomers, polyethylene elastomers, polyurethane elastomers, polyurea elastomers, metallocene-catalyzed elastomers and plastomers, copolymers of isobutylene and p-alkylstyrene, halogenated copolymers of isobutylene and p-alkylstyrene, copolymers of butadiene with acrylonitrile, polychloroprene, alkyl acrylate rubber, chlorinated isoprene rubber, acrylonitrile chlorinated isoprene rubber, and blends of two or more thereof. Preferably, the outer core layer is formed from a polybutadiene rubber composition.

The thermoset rubber composition may be cured using conventional curing processes. Suitable curing processes include, for example, peroxide-curing, sulfur-curing, high-energy radiation, and combinations thereof. Preferably, the rubber composition contains a free-radical initiator selected from organic peroxides, high energy radiation sources capable of generating free-radicals, and combinations thereof. In one preferred version, the rubber composition is peroxide-cured. Suitable organic peroxides include, but are not limited to, dicumyl peroxide; n-butyl-4,4-di(t-butylperoxy) valerate; 1,1-di(t-butylperoxy)3,3,5-trimethylcyclohexane; 2,5-dimethyl-2,5-di(t-butylperoxy) hexane; di-t-butyl peroxide; di-t-amyl peroxide; t-butyl peroxide; t-butyl cumyl peroxide; 2,5-dimethyl-2,5-di(t-butylperoxy)hexyne-3; di(2-t-butyl-peroxyisopropyl)benzene; dilauroyl peroxide; dibenzoyl peroxide; t-butyl hydroperoxide; and combinations thereof. In a particular embodiment, the free radical initiator is dicumyl peroxide, including, but not limited to Perkadox® BC, commercially available from Akzo Nobel. Peroxide free-radical initiators are generally present in the rubber composition in an amount of at least 0.05 parts by weight per 100 parts of the total rubber, or an amount within the range having a lower limit of 0.05 parts or 0.1 parts or 1 part or 1.25 parts or 1.5 parts or 2.5 parts or 5 parts by weight per 100 parts of the total rubbers, and an upper limit of 2.5 parts or 3 parts or 5 parts or 6 parts or 10 parts or 15 parts by weight per 100 parts of the total rubber. Concentrations are in parts per hundred (phr) unless otherwise indicated. As used herein, the term, "parts per hundred," also known as "phr" or "pph" is defined as the number of parts by weight of a particular component present in a mixture, relative to 100 parts by weight of the polymer component. Mathematically, this can be expressed as the weight of an ingredient divided by the total weight of the polymer, multiplied by a factor of 100.

The rubber compositions may further include a reactive cross-linking co-agent. Suitable co-agents include, but are not limited to, metal salts of unsaturated carboxylic acids having from 3 to 8 carbon atoms; unsaturated vinyl compounds and polyfunctional monomers (e.g., trimethylolpropane trimethacrylate); phenylene bismaleimide; and combinations thereof. Particular examples of suitable metal salts include, but are not limited to, one or more metal salts of acrylates, diacrylates, methacrylates, and dimethacrylates, wherein the metal is selected from magnesium, calcium, zinc, aluminum, lithium, and nickel. In a particular embodiment, the co-agent is selected from zinc salts of acrylates, diacrylates, methacrylates, and dimethacrylates. In another particular embodiment, the agent is zinc diacrylate (ZDA). When the co-agent is zinc diacrylate and/or zinc dimethacrylate, the co-agent is typically included in the rubber composition in an amount within the range having a lower limit of 1 or 5 or 10 or 15 or 19 or 20 parts by weight per 100 parts of the total rubber, and an upper limit of 24 or 25 or 30 or 35 or 40 or 45 or 50 or 60 parts by weight per 100 parts of the base rubber.

Radical scavengers such as a halogenated organosulfur, organic disulfide, or inorganic disulfide compounds may be added to the rubber composition. These compounds also may function as "soft and fast agents." As used herein, "soft and fast agent" means any compound or a blend thereof that is capable of making a core: 1) softer (having a lower compression) at a constant "coefficient of restitution" (COR); and/or 2) faster (having a higher COR at equal compression), when compared to a core equivalently prepared without a soft and fast agent. Preferred halogenated organosulfur compounds include, but are not limited to, pentachlorothiophenol (PCTP) and salts of PCTP such as zinc pentachlorothiophenol (ZnPCTP). Using PCTP and ZnPCTP in golf ball inner cores helps produce softer and faster inner cores. The PCTP and ZnPCTP compounds help increase the resiliency and the coefficient of restitution of the core. In a particular embodiment, the soft and fast agent is selected from ZnPCTP, PCTP, ditolyl disulfide, diphenyl disulfide, dixylyl disulfide, 2-nitroresorcinol, and combinations thereof.

The rubber composition also may include filler(s) such as materials selected from carbon black, nanoclays (e.g., Cloisite® and Nanofil® nanoclays, commercially available from Southern Clay Products, Inc., and Nanomax® and Nanomer® nanoclays, commercially available from Nanocor, Inc.), talc (e.g., Luzenac HAR® high aspect ratio talcs, commercially available from Luzenac America, Inc.), glass (e.g., glass flake, milled glass, and microglass), mica and mica-based pigments (e.g., Iriodin® pearl luster pigments, commercially available from The Merck Group), and combinations thereof. Metal fillers such as, for example, particulate; powders; flakes; and fibers of copper, steel, brass, tungsten, titanium, aluminum, magnesium, molybdenum, cobalt, nickel, iron, lead, tin, zinc, barium, bismuth, bronze, silver, gold, and platinum, and alloys and combinations thereof also may be added to the rubber composition to adjust the specific gravity of the composition as needed.

In addition, the rubber compositions may include antioxidants to prevent the breakdown of the elastomers. Also, processing aids such as high molecular weight organic acids and salts thereof may be added to the composition. Suitable organic acids are aliphatic organic acids, aromatic organic acids, saturated mono-functional organic acids, unsaturated monofunctional organic acids, multi-unsaturated mono-functional organic acids, and dimerized derivatives thereof. Particular examples of suitable organic acids include, but are not limited to, caproic acid, caprylic acid, capric acid, lauric acid, stearic acid, behenic acid, erucic acid, oleic acid, linoleic acid, myristic acid, benzoic acid, palmitic acid, phenylacetic acid, naphthalenoic acid, and dimerized derivatives thereof. The organic acids are aliphatic, mono-functional (saturated, unsaturated, or multi-unsaturated) organic acids. Salts of these organic acids may also be employed. The salts of organic acids include the salts of barium, lithium, sodium, zinc, bismuth, chromium, cobalt, copper, potassium, strontium, titanium, tungsten, magnesium, cesium, iron, nickel, silver, aluminum, tin, or calcium, salts of fatty acids, particularly stearic, behenic, erucic, oleic, linoelic or dimerized derivatives thereof. It is preferred that the organic acids and salts of the present invention are relatively non-migratory (they do not bloom to the surface of the polymer under ambient temperatures) and non-volatile (they do not volatilize at temperatures required for melt-blending.) Other ingredients such as accelerators (for example, tetra methylthiuram), processing aids, dyes and pigments, wetting agents, surfactants, plasticizers, coloring agents, fluorescent agents, chemical blowing and foaming agents, defoaming agents, stabilizers, softening agents, impact modifiers, antiozonants, as well as other additives known in the art may be added to the rubber composition.

Examples of commercially-available polybutadiene rubbers that can be used in accordance with this invention, include, but are not limited to, BR 01 and BR 1220, available from BST Elastomers of Bangkok, Thailand; SE BR 1220LA and SE BR1203, available from DOW Chemical Co of Midland, Mich.; BUDENE 1207, 1207s, 1208, and 1280 available from Goodyear, Inc of Akron, Ohio; BR 01, 51 and 730, available from Japan Synthetic Rubber (JSR) of Tokyo, Japan; BUNA CB 21, CB 22, CB 23, CB 24, CB 25, CB 29 MES, CB 60, CB Nd 60, CB 55 NF, CB 70 B, CB KA 8967, and CB 1221, available from Lanxess Corp. of Pittsburgh. Pa.; BR1208, available from LG Chemical of Seoul, South Korea; UBEPOL BR130B, BR150, BR150B, BR150L, BR230, BR360L, BR710, and VCR617, available from UBE Industries, Ltd. of Tokyo, Japan; EUROPRENE NEO-CIS BR 60, INTENE 60 AF and P30AF, and EUROPRENE BR HV80, available from Polimeri Europa of Rome, Italy; AFDENE 50 and NEODENE BR40, BR45, BR50 and BR60, available from Karbochem (PTY) Ltd. of Bruma, South Africa; KBR 01, NdBr 40, NdBR-45, NdBr 60, KBR 710S, KBR 710H, and KBR 750, available from Kumho Petrochemical Co., Ltd. Of Seoul, South Korea; DIENE 55NF, 70AC, and 320 AC, available from Firestone Polymers of Akron, Ohio.

The polybutadiene rubber is used in an amount of at least about 5% by weight based on total weight of composition and is generally present in an amount of about 5% to about 100%, or an amount within a range having a lower limit of 5% or 10% or 20% or 30% or 40% or 50% and an upper limit of 55% or 60% or 70% or 80% or 90% or 95% or 100%. Preferably, the concentration of polybutadiene rubber is about 40 to about 95 weight percent. If desirable, lesser amounts of other thermoset materials may be incorporated into the base rubber. Such materials include the rubbers discussed above, for example, cis-polyisoprene, trans-polyisoprene, balata, polychloroprene, polynorbornene, polyoctenamer, polypentenamer, butyl rubber, EPR, EPDM, styrene-butadiene, and the like.

As discussed above, in one embodiment, the core has a dual-layered structure. For example, an inner core (center) comprising a thermoplastic ethylene acid copolymer or thermoset rubber composition as described above may be prepared. Meanwhile, the outer core layer, which surrounds the inner core, also may comprise a thermoplastic or thermoset composition. In another embodiment, the core has a three-layered structure comprising an inner core, intermediate core layer, and outer core layer. For example, the core may include an an inner core comprising the plasticized thermoplastic composition of this invention; an intermediate core layer comprising a thermoplastic composition; and an outer core layer comprising a thermoset rubber composition.

Hardness of Core

The hardness of the core assembly (inner core and outer core layer) is an important property. In general, cores with relatively high hardness values have higher compression and tend to have good durability and resiliency. However, some high compression balls are stiff and this may have a detrimental effect on shot control and placement. Thus, the optimum balance of hardness in the core assembly needs to be attained.

In one preferred golf ball, the inner core (center) has a "positive" hardness gradient (that is, the outer surface of the inner core is harder than its geometric center); and the outer core layer has a "positive" hardness gradient (that is, the outer surface of the outer core layer is harder than the inner surface of the outer core layer.) In such cases where both the inner core and outer core layer each has a "positive" hardness gradient, the outer surface hardness of the outer core layer is preferably greater than the hardness of the geometric center of the inner core. In one preferred version, the positive hardness gradient of the inner core is in the range of about 2 to about 40 Shore C units and even more preferably about 10 to about 25 Shore C units; while the positive hardness gradient of the outer core is in the range of about 2 to about 20 Shore C and even more preferably about 3 to about 10 Shore C.

In an alternative version, the inner core may have a positive hardness gradient; and the outer core layer may have a "zero" hardness gradient (that is, the hardness values of the outer surface of the outer core layer and the inner surface of the outer core layer are substantially the same) or a "negative" hardness gradient (that is, the outer surface of the outer core layer is softer than the inner surface of the outer core layer.) For example, in one version, the inner core has a positive hardness gradient; and the outer core layer has a negative hardness gradient in the range of about 2 to about 25 Shore C. In a second alternative version, the inner core may have a zero or negative hardness gradient; and the outer core layer may have a positive hardness gradient. Still yet, in another embodiment, both the inner core and outer core layers have zero or negative hardness gradients.

In general, hardness gradients are further described in Bulpett et al., U.S. Pat. Nos. 7,537,529 and 7,410,429, the disclosures of which are hereby incorporated by reference. Methods for measuring the hardness of the inner core and outer core layers along with other layers in the golf ball and determining the hardness gradients of the various layers are described in further detail below. The core layers have positive, negative, or zero hardness gradients defined by hardness measurements made at the outer surface of the inner core (or outer surface of the outer core layer) and radially inward towards the center of the inner core (or inner surface of the outer core layer). These measurements are made typically at 2-mm increments as described in the test methods below. In general, the hardness gradient is determined by subtracting the hardness value at the innermost portion of the component being measured (for example, the center of the inner core or inner surface of the outer core layer) from the hardness value at the outer surface of the component being measured (for example, the outer surface of the inner core or outer surface of the outer core layer).

Positive Hardness Gradient. For example, if the hardness value of the outer surface of the inner core is greater than the hardness value of the inner core's geometric center (that is, the inner core has a surface harder than its geometric center), the hardness gradient will be deemed "positive" (a larger number minus a smaller number equals a positive number.) For example, if the outer surface of the inner core has a hardness of 67 Shore C and the geometric center of the inner core has a hardness of 60 Shore C, then the inner core has a positive hardness gradient of 7. Likewise, if the outer surface of the outer core layer has a greater hardness value than the inner surface of the outer core layer, the given outer core layer will be considered to have a positive hardness gradient.

Negative Hardness Gradient. On the other hand, if the hardness value of the outer surface of the inner core is less than the hardness value of the inner core's geometric center (that is, the inner core has a surface softer than its geometric center), the hardness gradient will be deemed "negative." For example, if the outer surface of the inner core has a hardness of 68 Shore C and the geometric center of the inner core has a hardness of 70 Shore C, then the inner core has a negative hardness gradient of 2. Likewise, if the outer surface of the outer core layer has a lesser hardness value than the inner surface of the outer core layer, the given outer core layer will be considered to have a negative hardness gradient.

Zero Hardness Gradient. In another example, if the hardness value of the outer surface of the inner core is substantially the same as the hardness value of the inner core's geometric center (that is, the surface of the inner core has about the same hardness as the geometric center), the hardness gradient will be deemed "zero." For example, if the outer surface of the inner core and the geometric center of the inner core each has a hardness of 65 Shore C, then the inner core has a zero hardness gradient. Likewise, if the outer surface of the outer core layer has a hardness value approximately the same as the inner surface of the outer core layer, the outer core layer will be considered to have a zero hardness gradient.

More particularly, the term, "positive hardness gradient" as used herein means a hardness gradient of positive 3 Shore C or greater, preferably 7 Shore C or greater, more preferably 10 Shore C, and even more preferably 20 Shore C or greater. The term, "zero hardness gradient" as used herein means a hardness gradient of less than 3 Shore C, preferably less than 1 Shore C and may have a value of zero or negative 1 to negative 10 Shore C. The term, "negative hardness gradient" as used herein means a hardness value of less than zero, for example, negative 3, negative 5, negative 7, negative 10, negative 15, or negative 20 or negative 25. The terms, "zero hardness gradient" and "negative hardness gradient" may be used herein interchangeably to refer to hardness gradients of negative 1 to negative 10.

The inner core preferably has a geometric center hardness ($H_{inner\ core\ center}$) of about 5 Shore D or greater. For example, the ($H_{inner\ core\ center}$) may be in the range of about 5 to about 88 Shore D and more particularly within a range having a lower limit of about 5 or 10 or 18 or 20 or 26 or 30 or 34 or 36 or 38 or 42 or 48 or 50 or 52 Shore D and an upper limit of about 54 or 56 or 58 or 60 or 62 or 64 or 68 or 70 or 74 or 76 or 80 or 82 or 84 or 88 Shore D. In another example, the center hardness of the inner core ($H_{inner\ core\ center}$), as measured in Shore C units, is preferably about 10 Shore C or greater; for example, the $H_{inner\ core\ center}$ may have a lower limit of about 10 or 14 or 16 or 20 or 23 or 24 or 28 or 31 or 34 or 37 or 40 or 44 Shore C and an upper limit of about 46 or 48 or 50 or 51 or 53 or 55 or 58 or 61 or 62 or 65 or 68 or 71 or 74 or 76 or 78 or 79 or 80 or 84 or 90 Shore C. Concerning the outer surface hardness of the inner core ($H_{inner\ core\ surface}$), this hardness is preferably about 12 Shore D or greater; for example, the $H_{inner\ core\ surface}$ may fall within a range having a lower limit of about 12 or 15 or 18 or 20 or 22 or 26 or 30 or 34 or 36 or 38 or 42 or 48 or 50 or 52 Shore D and an upper limit of about 54 or 56 or 58 or 60 or 62 or 70 or 72 or 75 or 78 or 80 or 82 or 84 or 86 or 90 Shore D. In one version, the outer surface hardness of the inner core ($H_{inner\ core\ surface}$), as measured in Shore C units, has a lower limit of about 13 or 15 or 18 or 20 or 22 or 24 or 27 or 28 or 30 or 32 or 34 or 38 or 44 or 47 or 48 Shore C and an upper limit of about 50 or 54 or 56 or 61 or 65 or 66 or 68 or 70 or 73 or 76 or 78 or 80 or 84 or 86 or 88 or 90 or 92 Shore C. In another version, the geometric center hardness ($H_{inner\ core\ center}$) is in the range of about 10 Shore C to about 50 Shore C; and the outer surface hardness of the inner core ($H_{inner\ core\ surface}$) is in the range of about 5 Shore C to about 50 Shore C.

Meanwhile, the intermediate core layer preferably has an outer surface hardness ($H_{outer\ surface\ of\ the\ Inter\ Core}$) of about 30 Shore D or greater, and more preferably within a range having a lower limit of about 30 or 35 or 40 or 42 or 44 or 46 or 48 or 50 or 52 or 54 or 56 or 58 and an upper limit of about 60 or 62 or 64 or 70 or 74 or 78 or 80 or 82 or 85 or 87 or 88 or 90 Shore D. The outer surface hardness of the intermediate core layer ($H_{outer\ surface\ of\ the\ Inter\ Core}$), as measured in Shore C units, preferably has a lower limit of about 30 or 32 or 36 or 40 or 45 or 50 or 55 or 60 or 63 or 65 or 67 or 70 or 73 or 75 or 76 or 78 Shore C, and an upper limit of about 78 or 80 or 85 or 87 or 89 or 90 or 92 or 93 or 95 Shore C. While, the midpoint (or inner surface) hardness of the intermediate core ($H_{midpoint\ of\ the\ Inter\ Core}$) preferably is about 25 Shore D or greater and more preferably is within a range having a lower limit of about 26 or 30 or 34 or 36 or 38 or 42 or 48 of 50 or 52 Shore D and an upper limit of about 54 or 56 or 58 or 60 or 62 Shore D. As measured in Shore C units, the midpoint hardness of the intermediate core ($H_{midpoint\ of\ the\ Inter\ Core}$) preferably has a lower limit of about 35 or 38 or 44 or 52 or 58 or 60 or 70 or 74 Shore C and an upper limit of about 76 or 78 or 80 or 84 or 86 or 88 or 90 or 92 or 96 Shore C.

On the other hand, the outer core layer preferably has an outer surface hardness ($H_{outer\ surface\ of\ OC}$) of about 40 Shore D or greater, and more preferably within a range having a lower limit of about 40 or 42 or 44 or 46 or 48 or 50 or 52 and an upper limit of about 54 or 56 or 58 or 60 or 62 or 64 or 70 or 74 or 78 or 80 or 82 or 85 or 87 or 88 or 90 Shore D. The outer surface hardness of the outer core layer ($H_{outer\ surface\ of\ OC}$), as measured in Shore C units, preferably has a lower limit of about 40 or 42 or 45 or 48 or 50 or 54 or 58 or 60 or 63 or 65 or 67 or 70 or 72 or 73 or 76 Shore C, and an upper limit of about 78 or 80 or 84 or 87 or 88 or 89 or 90 or 92 or 95 Shore C. And, the inner surface of the outer core layer ($H_{inner\ surface\ of\ OC}$) or midpoint hardness of the outer core layer ($H_{midpoint\ of\ OC}$), preferably has a hardness of about 40 Shore D or greater, and more preferably within a range having a lower limit of about 40 or 42 or 44 or 46 or 48 or 50 or 52 and an upper limit of about 54 or 56 or 58 or 60 or 62 or 64 or 70 or 74 or 78 or 80 or 82 or 85 or 87 or 88 or 90 Shore D. The inner surface hardness ($H_{inner\ surface\ of\ OC}$) or midpoint hardness ($H_{midpoint\ of\ OC}$) of the outer core layer, as measured in Shore C units, preferably has a lower limit of about 40 or 42 or 44 or 45 or 47 or 50 or 52 or 54 or 55 or 58 or 60 or 63 or 65 or 67 or 70 or 73 or 75 Shore C, and an upper limit of about 78 or 80 or 85 or 88 or 89 or 90 or 92 or 95 Shore C.

The midpoint of a core layer is taken at a point equidistant from the inner surface and outer surface of the layer to be measured, most typically an outer core layer. Once one or more core layers surround a layer of interest, the exact midpoint may be difficult to determine, therefore, for the purposes of the present invention, the measurement of "midpoint" hardness of a layer is taken within plus or minus 1 mm of the measured midpoint of the layer.

In one embodiment, the outer surface hardness of the outer core layer ($H_{outer\ surface\ of\ OC}$), is less than the outer surface hardness ($H_{inner\ core\ surface}$) or midpoint hardness ($H_{midpoint\ of\ OC}$), of the inner core by at least 3 Shore C units and more preferably by at least 5 Shore C.

In a second embodiment, the outer surface hardness of the outer core layer ($H_{outer\ surface\ of\ OC}$), is greater than the outer surface hardness ($H_{inner\ core\ surface}$) or midpoint hardness ($H_{midpoint\ of\ OC}$), of the inner core by at least 3 Shore C units and more preferably by at least 5 Shore C.

As discussed above, the inner core is preferably formed from a thermoplastic composition and more preferably an ethylene acid copolymer/plasticizer composition. And, the outer core layer is formed preferably from a thermoset composition such as polybutadiene rubber. In other embodiments, the outer core layer also may be formed from thermoplastic compositions, particularly ethylene acid copolymer/plasticizer compositions.

The core structure also has a hardness gradient across the entire core assembly. In one embodiment, the ($H_{inner\ core\ center}$) is in the range of about 10 Shore C to about 60 Shore C, preferably about 13 Shore C to about 55 Shore C; and the ($H_{outer\ surface\ of\ OC}$) is in the range of about 65 to about 96 Shore C, preferably about 68 Shore C to about 94 Shore C or about 75 Shore C to about 93 Shore C, to provide a positive hardness gradient across the core assembly. In another embodiment, there is a zero or negative hardness gradient across the core assembly. For example, the center of the core ($H_{inner\ core\ center}$) may have a hardness gradient in the range of 20 to 90 Shore C; and the outer surface of the outer core may have a hardness gradient in the range of 10 to 80 Shore C. The hardness gradient across the core assembly will vary based on several factors including, but not limited to, the dimensions of the inner core, intermediate core, and outer core layers.

The United States Golf Association (USGA) has established a maximum weight of 45.93 g (1.62 ounces) for golf balls. For play outside of USGA rules, the golf balls can be heavier than 1.62 ounces. In one preferred embodiment, the weight of the multi-layered core is in the range of about 28 to about 38 grams. Also, golf balls made in accordance with this invention can be of any size, although the USGA requires that golf balls used in competition have a diameter of at least 1.68 inches. "Oversized" golf balls having relatively large diameters are described further below. For play outside of USGA rules, the golf balls can be of a smaller size. Normally, golf balls are manufactured in accordance with USGA requirements and have a diameter in the range of about 1.68 to about 1.80 inches. As discussed above, the golf ball contains a cover which may be multi-layered and in addition may contain intermediate layers, and the thickness levels of these layers also must be considered. Thus, in general, the dual-layer core structure normally has an overall diameter within a range having a lower limit of about 1.00 or 1.20 or 1.30 or 1.40 inches and an upper limit of about 1.58 or 1.60 or 1.62 or 1.66 inches, and more preferably in the range of about 1.3 to 1.65 inches. In one embodiment, the diameter of the core assembly is in the range of about 1.45 to about 1.62 inches.

The hardness of the core assembly (for example, inner core, intermediate core layer, and outer core layer) is an important property. In general, cores with relatively high hardness values have higher compression and tend to have good durability and resiliency. However, some high compression balls are stiff and this may have a detrimental effect on shot control and placement. Thus, the optimum balance of hardness in the core assembly needs to be attained. The present invention provides core assemblies having both good resiliency (CoR) and compression properties as demonstrated in the Examples below.

Manufacturing of Golf Balls

The inner core may be formed by any suitable technique including compression and injection molding methods. The outer core layer, which surrounds the inner core, is formed by molding compositions over the inner core. Compression or injection molding techniques may be used to form the other layers of the core assembly. Then, the cover layers are applied over the core assembly. Prior to this step, the core structure may be surface-treated to increase the adhesion between its outer surface and the next layer that will be applied over the core. Such surface-treatment may include mechanically or chemically-abrading the outer surface of the core. For example, the core may be subjected to corona-discharge, plasma-treatment, silane-dipping, or other treatment methods known to those in the art.

The cover layers are formed over the core or ball assembly (the core structure and any intermediate layers disposed about the core) using a suitable technique such as, for example, compression-molding, flip-molding, injection-molding, retractable pin injection-molding, reaction injection-molding (RIM), liquid injection-molding, casting, spraying, powder-coating, vacuum-forming, flow-coating, dipping, spin-coating, and the like. Preferably, each cover layer is separately formed over the ball sub-assembly. For example, an ethylene acid copolymer ionomer composition may be injection-molded to produce half-shells. Alternatively, the ionomer composition can be placed into a compression mold and molded under sufficient pressure, temperature, and time to produce the hemispherical shells. The smooth-surfaced hemispherical shells are then placed around the core sub-assembly in a compression mold. Under sufficient heating and pressure, the shells fuse together to form an inner cover layer that surrounds the sub-assembly. In another method, the ionomer composition is injection-molded directly onto the core sub-assembly using retractable pin injection molding. An outer cover layer comprising a polyurethane or polyurea composition over the ball sub-assembly may be formed by using a casting process.

After the golf balls have been removed from the mold, they may be subjected to finishing steps such as flash-trimming, surface-treatment, marking, coating, and the like using techniques known in the art. For example, in traditional white-colored golf balls, the white-pigmented cover may be surface-treated using a suitable method such as, for example, corona, plasma, or ultraviolet (UV) light-treatment. Then, indicia such as trademarks, symbols, logos, letters, and the like may be printed on the ball's cover using pad-printing, ink-jet printing, dye-sublimation, or other suitable printing methods. Clear surface coatings (for example, primer and top-coats), which may contain a fluorescent whitening agent, are applied to the cover. The resulting golf ball has a glossy and durable surface finish.

In another finishing process, the golf balls are painted with one or more paint coatings. For example, white primer paint may be applied first to the surface of the ball and then a white top-coat of paint may be applied over the primer. Of course, the golf ball may be painted with other colors, for example, red, blue, orange, and yellow. As noted above, markings such as trademarks and logos may be applied to the painted cover of the golf ball. Finally, a clear surface coating may be applied to the cover to provide a shiny appearance and protect any logos and other markings printed on the ball.

It should be understood that the golf ball constructions described above are for illustrative purposes only, and they are not meant to be restrictive. Other golf ball constructions can be made in accordance with this invention.

For example, in one embodiment, a low compression four-piece golf ball may be constructed with an inner core and outer core layer, both comprising a thermoset polybutadiene composition, an inner cover layer comprising the plasticized thermoplastic composition of this invention, and an outer cover layer comprising an ionomer or polyurethane composition. In another embodiment, the outer cover layer may be made of the plasticized thermoplastic composition as described herein. In yet another embodiment, a five-piece ball can be constructed, wherein the inner core and/or outer core layer comprises a thermoset polybutadiene or plasticized thermoplastic as described herein, an inner cover comprising an ionomer material, an intermediate layer comprising the plasticized thermoplastic, and an outer cover layer comprising an ionomer or polyurethane material.

It is further recognized that the ethylene acid copolymer/plasticizer compositions of this invention may be used to form one or more core, intermediate, or cover layers. For instance, the compositions may be used in an innermost core or center layer, an intermediate core layer, or in an outermost core layer. The composition also may be used, for example, in an inner, intermediate, or outermost cover layer as described herein. The compositions have a good combination of properties including Coefficient of Restitution (CoR) and compression so they can be used to make any golf ball layer in any golf ball construction. The golf balls preferably have a compression of less than 60 and more preferably less than 50. As discussed above, golf balls having various constructions (for example, one, two, there, four, and five-piece balls) with low compressions may be made in accordance with this invention. The balls of this invention preferably have dimensions, weight, and other properties that comply with USGA regulations and rules. The balls, however, are not required to have such properties and the balls can be played in events that do not follow USGA regulations and rules. Different examples of golf balls made with the plasticized thermoplastic composition of this invention are described further below.

Test Methods

Hardness. The center hardness of a core is obtained according to the following procedure. The core is gently pressed into a hemispherical holder having an internal diameter approximately slightly smaller than the diameter of the core, such that the core is held in place in the hemispherical portion of the holder while concurrently leaving the geometric central plane of the core exposed. The core is secured in the holder by friction, such that it will not move during the cutting and grinding steps, but the friction is not so excessive that distortion of the natural shape of the core would result. The core is secured such that the parting line of the core is roughly parallel to the top of the holder. The diameter of the core is measured 90 degrees to this orientation prior to securing. A measurement is also made from the bottom of the holder to the top of the core to provide a reference point for future calculations. A rough cut is made slightly above the exposed geometric center of the core using a band saw or other appropriate cutting tool, making sure that the core does not move in the holder during this step. The remainder of the core, still in the holder, is secured to the base plate of a surface grinding machine. The exposed 'rough' surface is ground to a smooth, flat surface, revealing the geometric center of the core, which can be verified by measuring the height from the bottom of the holder to the exposed surface of the core, making sure that exactly half of the original height of the core, as measured above, has been removed to within 0.004 inches. Leaving the core in the holder, the center of the core is found with a center square and carefully marked and the hardness is measured at the center mark according to ASTM D-2240. Additional hardness measurements at any distance from the center of the core can then be made by drawing a line radially outward from the center mark, and measuring the hardness at any given distance along the line, typically in 2 mm increments from the center. The hardness at a particular distance from the center should be measured along at least two, preferably four, radial arms located 180° apart, or 90° apart, respectively, and then averaged. All hardness measurements performed on a plane passing through the geometric center are performed while the core is still in the holder and without having disturbed its orientation, such that the test surface is constantly parallel to the bottom of the holder, and thus also parallel to the properly aligned foot of the durometer.

The outer surface hardness of a golf ball layer is measured on the actual outer surface of the layer and is obtained from the average of a number of measurements taken from opposing hemispheres, taking care to avoid making measurements on the parting line of the core or on surface defects, such as holes or protrusions. Hardness measurements are made pursuant to ASTM D-2240 "Indentation Hardness of Rubber and Plastic by Means of a Durometer." Because of the curved surface, care must be taken to ensure that the golf ball or golf ball sub-assembly is centered under the durometer indenter before a surface hardness reading is obtained. A calibrated, digital durometer, capable of reading to 0.1 hardness units is used for the hardness measurements and is set to record the maximum hardness reading attained for each measurement. The digital durometer must be attached to, and its foot made parallel to, the base of an automatic stand. The weight on the durometer and attack rate conforms to ASTM D-2240.

In certain embodiments, a point or plurality of points measured along the "positive" or "negative" gradients may be above or below a line fit through the gradient and its outermost and innermost hardness values. In an alternative preferred embodiment, the hardest point along a particular steep "positive" or "negative" gradient may be higher than the value at the innermost portion of the inner core (the geometric center) or outer core layer (the inner surface)—as long as the outermost point (i.e., the outer surface of the inner core) is greater than (for "positive") or lower than (for "negative") the innermost point (i.e., the geometric center of the inner core or the inner surface of the outer core layer), such that the "positive" and "negative" gradients remain intact.

As discussed above, the direction of the hardness gradient of a golf ball layer is defined by the difference in hardness measurements taken at the outer and inner surfaces of a particular layer. The center hardness of an inner core and hardness of the outer surface of an inner core in a single-core ball or outer core layer are readily determined according to the test procedures provided above. The outer surface of the inner core layer (or other optional intermediate core layers) in a dual-core ball are also readily determined according to the procedures given herein for measuring the outer surface hardness of a golf ball layer, if the measurement is made prior to surrounding the layer with an additional core layer. Once an additional core layer surrounds a layer of interest, the hardness of the inner and outer surfaces of any inner or intermediate layers can be difficult to determine. Therefore, for purposes of the present invention, when the hardness of the inner or outer surface of a core layer is needed after the inner layer has been surrounded with another core layer, the test procedure described above for measuring a point located 1 mm from an interface is used. Likewise, the midpoint of a core or inner cover layer is taken at a point equidistant from the inner surface and outer surface of the layer to be measured, most typically an outer core layer. Also, once one or more layers surround a layer of interest, the exact midpoint may be difficult to determine, therefore, for purposes of the present invention, the measurement of "midpoint" hardness of a layer is taken within plus or minus 1 mm of the measured midpoint of the layer.

Also, it should be understood that there is a fundamental difference between "material hardness" and "hardness as measured directly on a golf ball." For purposes of the present invention, material hardness is measured according to ASTM D2240 and generally involves measuring the hardness of a flat "slab" or "button" formed of the material. Surface hardness as measured directly on a golf ball (or other spherical surface) typically results in a different hardness value. The difference in "surface hardness" and "material hardness" values is due to several factors including, but not limited to, ball construction (that is, core type, number of cores and/or cover layers, and the like); ball (or sphere) diameter; and the material composition of adjacent layers. It also should be understood that the two measurement techniques are not linearly related and, therefore, one hardness value cannot easily be correlated to the other. Shore hardness (for example, Shore C or Shore D hardness) was measured according to the test method ASTM D-2240.

Compression. As disclosed in Jeff Dalton's Compression by Any Other Name, Science and Golf IV, Proceedings of the World Scientific Congress of Golf (Eric Thain ed., Routledge, 2002) ("J. Dalton"), several different methods can be used to measure compression, including Atti compression, Riehle compression, load/deflection measurements at a variety of fixed loads and offsets, and effective modulus. The DCM is an apparatus that applies a load to a core or ball and measures the number of inches the core or ball is deflected at measured loads. A load/deflection curve is generated that is fit to the Atti compression scale that results in a number being generated that represents an Atti compression. The DCM does this via a load cell attached to the bottom of a hydraulic cylinder that is triggered pneumatically at a fixed rate (typically about 1.0 ft/s) towards a stationary core. Attached to the cylinder is an LVDT that measures the distance the cylinder travels during the testing timeframe. A software-based logarithmic algorithm ensures that measurements are not taken until at least five successive increases in load are detected during the initial phase of the test.

Coefficient of Restitution ("COR"). The COR is determined according to a known procedure, wherein a golf ball or golf ball sub-assembly (for example, a golf ball core) is fired from an air cannon at two given velocities and a velocity of 125 ft/s is used for the calculations. Ballistic light screens are located between the air cannon and steel plate at a fixed distance to measure ball velocity. As the ball travels toward the steel plate, it activates each light screen and the ball's time period at each light screen is measured. This provides an incoming transit time period which is inversely proportional to the ball's incoming velocity. The ball makes impact with the steel plate and rebounds so it passes again through the light screens. As the rebounding ball activates each light screen, the ball's time period at each screen is measured. This provides an outgoing transit time period which is inversely proportional to the ball's outgoing velocity. The COR is then calculated as the ratio of the ball's outgoing transit time period to the ball's incoming transit time period ($COR=V_{out}/V_{in}=T_{in}/T_{out}$).

EXAMPLES

The present invention is illustrated further by the following Examples, but these Examples should not be construed as limiting the scope of the invention.

The following commercially available materials were used in the below examples:

CB23 high-cis neodymium-catalyzed polybutadiene rubber, commercially available from Lanxess Corporation;

Fusabond® N525 metallocene-catalyzed polyethylene, Fusabond® N416 chemically modified ethylene elastomer, Fusabond® C190 anhydride modified ethylene vinyl acetate copolymer, and Fusabond® P614 functionalized polypropylene, commercially available from E. I. du Pont de Nemours and Company;

HPC 1022 is a bimodal ionomer that is 100% neutralized with a zinc cation source and the composition of which is described in U.S. Pat. Nos. 6,562,906, and 8,193,283, as well as U.S. Pat. Nos. 8,410,219 and 8,410,220, all of which are incorporated by reference herein;

HPC 1043 is a bimodal ionomer that is 100% neutralized with a magnesium cation source and the composition of which is described in U.S. Pat. Nos. 6,562,906, and 8,193, 283, as well as U.S. Pat. Nos. 8,410,219 and 8,410,220, all of which are incorporated by reference herein;

Nucrel® 9-1, Nucrel® 599, Nucrel® 960, Nucrel® 0407, Nucrel® 0609, Nucrel® 1214, Nucrel® 2906, Nucrel® 2940, Nucrel® 30707, Nucrel® 31001, and Nucrel® AE acid copolymers, commercially available from E. I. du Pont de Nemours and Company and particularly Nucrel® 9-1 is a copolymer of ethylene with 23.5% n-butyl acrylate, and about 9% methacrylic acid that is unneutralized;

Nucrel® 2940 is a copolymer of ethylene and about 19% methacrylic acid that is unneutralized;

Nucrel® 0403 is a copolymer of ethylene and about 4% methacrylic acid that is unneutralized;

Nucrel® 960 is a copolymer of ethylene and about 15% methacrylic acid that is unneutralized;

Primacor® 3150, 3330, 5980I, 5986, and 5990I acid copolymers, commercially available from The Dow Chemical Company—Primacor 5980i and 5986 are both copolymers of ethylene with about 20% acrylic acid;

Surlyn® 6320 is based on a copolymer of ethylene with 23.5% n-butyl acrylate, and about 9% methacrylic acid that is about 50% neutralized with a magnesium cation source, commercially available from E. I. du Pont de Nemours and Company;

Surlyn® 8150 is based on a copolymer of ethylene with about 19% methacrylic acid that is about 45% neutralized with a sodium cation source, commercially available from E. I. du Pont de Nemours and Company;

Surlyn® 8320 is based on a copolymer of ethylene with 23.5% n-butyl acrylate, and about 9% methacrylic acid that is about 52% neutralized with a sodium cation source, commercially available from E. I. du Pont de Nemours and Company;

Surlyn® 9120 is based on a copolymer of ethylene with about 19% methacrylic acid that is about 36% neutralized with a zinc cation source, commercially available from E. I. du Pont de Nemours and Company; and Surlyn® 9320 is based on a copolymer of ethylene with 23.5% n-butyl acrylate, and about 9% methacrylic acid that is about 41% neutralized with a zinc cation source, commercially available from E. I. du Pont de Nemours and Company.

Solid spheres of each composition were injection molded, and the solid sphere COR, compression, Shore D hardness, and Shore C hardness of the resulting spheres were measured after two weeks. The results are reported in the Tables below. The surface hardness of a sphere is obtained from the average of a number of measurements taken from opposing hemispheres, taking care to avoid making measurements on the parting line of the sphere or on surface defects, such as holes or protrusions. Hardness measurements are made pursuant to ASTM D-2240 "Indentation Hardness of Rubber and Plastic by Means of a Durometer." Because of the curved surface, care must be taken to ensure that the sphere is centered under the durometer indentor before a surface hardness reading is obtained. A calibrated, digital durometer, capable of reading to 0.1 hardness units is used for all hardness measurements and is set to record the maximum hardness reading obtained for each measurement. The digital durometer must be attached to, and its foot made parallel to, the base of an automatic stand. The weight on the durometer and the attack rate conform to ASTM D-2240.

In the following examples, acid copolymer compositions (which contain fully neutralized, bimodal ionomers) were made. These compositions and the properties of these materials are described in Table 1 below. All percentages are based on total weight percent of the composition, unless otherwise indicated.

TABLE 1

Properties of Solid Spheres Made from Bimodal Ionomer/Plasticizer Compositions.

| Ex. | First Ingr. | 2nd Ingr. | CoR@ 125 ft/s | DCM | Shore D Hardness | Shore C Hardness | SFI Compression (DCM) | SFI Shore D Hardness | SFI Shore C Hardness |
|---|---|---|---|---|---|---|---|---|---|
| 1A | HPC AD1022 (100%) |  | 0.495 | 43 | 32.0 | 54.4 | −0.299 | −0.261 | −0.263 |
| 1B | HPC AD1022 (90%) | Ethyl Oleate (10%) | 0.544 | 2 | 24.1 | 46.0 | −0.195 | −0.157 | −0.178 |
| 1C | HPC AD1043 (100%) |  | 0.687 | 78 | 38.9 | 71.6 | −0.153 | −0.117 | −0.146 |
| 1D | HPC AD1043 (90%) | Ethyl Oleate (10%) | 0.717 | 49 | 31.7 | 62.8 | −0.084 | −0.037 | −0.078 |
| 1E | HPC AD1043 (80%) | Ethyl Oleate (20%) | 0.714 | 19 | 27.7 | 45.9 | −0.048 | −0.012 | −0.007 |
| 1F | HPC AD1022 (80%) | Ethyl Oleate (20%) | 0.554 | −41 | 21.4 | 31.9 | −0.129 | −0.128 | −0.107 |
| 1G | HPC AD1043 (70%) | Ethyl Oleate (30%) | 0.684 | −20 | 21.5 | 31.5 | −0.026 | 0.002 | 0.025 |
| 1H | HPC AD1022 (70%) | Ethyl Oleate (30%) | 0.526 | −89 | 15.9 | 20.6 | −0.093 | −0.117 | −0.086 |

In the following examples, acid copolymer ionomer blend compositions were made. These compositions and the properties of these materials are described in Table 2 below. All percentages are based on total weight percent of the composition, unless otherwise indicated.

TABLE 2

Properties of Solid Spheres Made from Acid Copolymer Ionomer Blend Compositions.

| Ex. | First Ingredient | Second Ingredient | Third Ingredient | CoR@ 125 ft/s | DCM | Shore D Hardness | Shore C Hardness |
|---|---|---|---|---|---|---|---|
| 2A | Surlyn 6910 (77%) | Surlyn 8320 (23%) | | 0.722 | 151 | 65.3 | 92.3 |
| 2B | Surlyn 6910 (70%) | Surlyn 8320 (21%) | Ethyl Oleate (9%) | 0.753 | 141 | 59.1 | 87.5 |
| 2C | Surlyn 7940 (77%) | Surlyn 8320 (23%) | | 0.708 | 157 | 63.6 | 89.9 |
| 2D | Surlyn 7940 (70%) | Surlyn 8320 (21%) | Ethyl Oleate (9%) | 0.682 | 144 | 54.7 | 82.4 |
| 2E | Surlyn 8945 (77%) | Surlyn 8320 (23%) | | 0.683 | 157 | 62.9 | 89.7 |
| 2F | Surlyn 8945 (70%) | Surlyn 8320 (21%) | Ethyl Oleate (9%) | 0.651 | 140 | 52.0 | 78.6 |
| 2G | Surlyn 9945 (77%) | Surlyn 8320 (23%) | | 0.645 | 154 | 60.1 | 87.1 |
| 2H | Surlyn 9945 (70%) | Surlyn 8320 (21%) | Ethyl Oleate (9%) | 0.627 | 131 | 50.4 | 76.0 |

As shown in above Table 2, sample ethylene acid copolymer ionomer and ethylene acid ester terpolymer ionomer blends were prepared, and spheres were made from these blend compositions. Some of the ionomer blends did not contain plasticizer (Samples 2A, 2C, 2E, and 2G), while other ionomer blends contained plasticizer (Samples 2B, 2D, 2F, and 2H). Interestingly, only Sample 2B showed an increase in CoR versus its respective control (Sample 2A). In this instance, it is believed the composition of the ionomer blend is significant. The ionomer blend containing plasticizer in Sample 2B used a blend of Mg/Na cations as the neutralizing agent for the acid groups. In contrast, the other ionomer blends containing plasticizer in Table 2 used a blend of Li/Na cations (Sample 2D), or a blend of Na/Na cations (Sample 2F), or a blend of Zn/Na cations (Sample 2H) as the neutralizing agent. In one preferred embodiment of this invention, a composition comprising an ethylene acid copolymer ionomer and ethylene acid ester terpolymer ionomer blend containing a blend of Mg/Na cations is used to form the outer or inner cover layer or other layer of the golf ball construction.

In the following examples, some sample highly neutralized (HNP) ethylene acid copolymer compositions were made and the hardness values (Shore C and Shore D) of these materials were measured. These compositions and the properties of these materials are described in Tables 3 and 3A below. All percentages are based on total weight percent of the composition, unless otherwise indicated.

The hardness of the sample spheres was measured at their outer surface and geometric centers. The hardness gradient is determined by subtracting the hardness value at the geometric center of the sphere from the hardness value at the outer surface of the sphere. If the hardness value of the outer surface is greater than the hardness value of the center, the hardness gradient is deemed "positive." Conversely, if the hardness value of the outer surface of the sphere is less than the hardness value of the sphere's center, the hardness gradient will be "negative." As reported in below Tables 3 and 3A, the samples demonstrate a wide range of "surface-to-center" gradients including positive, negative, and zero hardness gradients.

For the below Samples in Tables 3 and 3A, and for all plasticized thermoplastic compositions herein, it is generally established that the hardness measured at any point in between the geometric and the outer surface is within plus or minus 7, and more preferably within plus or minus 5, and most preferably within plus or minus 3 of the geometric center hardness and the surface hardness values. That is, for Sample "3A", the hardness at any point between the geometric center and the outer surface is most preferably, within a range of from 77.1 to 95.9 Shore C, and typically is a value that is between the geometric center and the outer surface, i.e., is within the range of from 80.1 Shore C to 92.9 Shore C. Therefore, the hardness at any point between the geometric and the outer surface of Sample "3A" may, most preferably, be a value of 78, 81, 82, 83, 84, 85, 86, 87, 88, 89, 90, 91, 92, 93, 94, or 95 Shore C.

Likewise for above Sample "3F", the hardness measured at any point between the geometric center and the outer surface will, most preferably, be within a range of from 32.5 to 44.4, and for Sample "3D", the hardness measured at any point between the geometric center and the outer surface will, most preferably, be within the range of from 63.5 to 71.5 Shore C, and so forth for other plasticized thermoplastic compositions

TABLE 3

Hardness Gradients of Sample HNP/Plasticizer Compositions

| Example | First Ingredient | Second Ingredient | Aging of Sphere (Weeks) |
|---|---|---|---|
| 3A | HPF 1000 (100%) | | 20 |
| 3B | HPF 1000 (90%) | Ethyl Oleate (10%) | 21 |
| 3C | HPF 2000 (100%) | | 20 |
| 3D | HPF 2000 (90%) | Ethyl Oleate (10%) | 20 |
| 3E | HPF 2000 (80%) | Ethyl Oleate (20%) | 9 |
| 3F | HPF 1000 (70%) | Ethyl Oleate (30%) | 9 |

TABLE 3A

Hardness Gradient of Sample HNP/Plasticizer Compositions

| Example | Sphere Surface Hardness (Shore C) | Sphere Center Hardness (Shore C) | Surface-to-Center Gradient (Shore C) | Sphere Surface Hardness (Shore D) | Sphere Center Hardness (Shore D) | Surface-to-Center Gradient (Shore D) |
|---|---|---|---|---|---|---|
| 3A | 92.9 | 80.1 | 12.8 | 58.6 | 50.5 | 8.1 |
| 3B | 85.4 | 74.2 | 11.2 | 54.0 | 43.8 | 10.2 |
| 3C | 78.5 | 75.1 | 3.4 | 47.4 | 45.8 | 1.6 |
| 3D | 68.5 | 66.5 | 2.0 | 38.4 | 37.6 | 0.8 |

TABLE 3A-continued

Hardness Gradient of Sample HNP/Plasticizer Compositions

| Example | Sphere Surface Hardness (Shore C) | Sphere Center Hardness (Shore C) | Surface-to-Center Gradient (Shore C) | Sphere Surface Hardness (Shore D) | Sphere Center Hardness (Shore D) | Surface-to-Center Gradient (Shore D) |
|---|---|---|---|---|---|---|
| 3E | 51.8 | 53.4 | −1.6 | 29.4 | 27.7 | 1.7 |
| 3F | 35.5 | 41.4 | −5.9 | 20.3 | 21.7 | −1.4 |

The melt flow index of the compositions also can be measured using ASTM D-1238 at 190° C. with a 2160 gram weight. In a preferred embodiment, the addition of the plasticizer increases the melt flow index of the composition by a magnitude of at least 0.5 g/10 minutes, more preferably at least 1.0 g/10 minutes, and even more preferably at least 2.0 or 3.0 g/10 minutes.

In the following Prophetic Examples, different golf ball constructions are prepared and the properties of these balls are reported. To prepare these sample balls, different core formulations (see below Table 5) are prepared and these formulations are molded into spherical core layers. Then, different cover formulations (see below Tables 4 and 4A) are prepared and these formulations are molded into covers overlying the core layers. The properties of the resulting balls are reported in below Table 6.

TABLE 4

Cover Layer Formulations

| Sample No. | E1 | E2 | E3 | E4 | E5 | E6 | E7 | E8 | CE1 |
|---|---|---|---|---|---|---|---|---|---|
| Composition | | | | | | | | | |
| HPF 2000 | 80 | | | | | | | | 100 |
| HPF 1000 | | | | | | | | 90 | |
| HPC AD1022 | | | | | 90 | | | | |
| HPC AD1043 | | | | | | 90 | 85.7 | | |
| Primacor 5980i | | 16.5 | | | | | | | |
| Surlyn 6320 | | | | 90 | | | | | |
| Nucrel 2940 | | | 90 | | | | | | |
| Fusabond N525 | | 34.2 | | | | | | | |
| Oelic Acid | | 33.9 | | | | | | | |
| Magnesium Hydroxide | | 5.4 | | | | | | | |
| Ethyl Oleate | 20 | 10 | 10 | 10 | 10 | 10 | 9.5 | 10 | |
| White MB | | | | | | | | 4.8 | |
| Properties | | | | | | | | | |
| Compression | 32 | 31 | 59 | 38 | 2 | 49 | 52 | 99 | 91 |
| Shore C | 53.0 | 60.2 | 58.4 | 56.8 | 46.0 | 62.8 | 64 | 81.2 | 76.5 |
| Shore D | 30.2 | 34.3 | 36.7 | 29.4 | 24.1 | 31.7 | 33 | 47.2 | 46.1 |
| CoR at 125 ft/s | 0.810 | 0.783 | 0.458 | 0.699 | 0.544 | 0.717 | 0.714 | 0.846 | 0.856 |

TABLE 4A

Additional Cover Layer Formulations

| Sample No. | CE2 | CE3 | CE4 | CE5 | CE6 | CE7 | CE8 | CE9 | CE 10 |
|---|---|---|---|---|---|---|---|---|---|
| Composition | | | | | | | | | |
| HPC AD1022 | | | | 100 | | | | | |
| HPC AD1043 | | | | | 100 | | | | |
| Surlyn 6320 | | | 100 | | | | | | |
| Primacor 5980i | 18.3 | | | | | | | | |
| Nucrel 2940 | | 100 | | | | | | | |
| Fusabond N525 | 38.1 | | | | | | 14.2 | | |
| Oleic acid | 37.6 | | | | | | | | |
| Magnesium Hydroxide | 6 | | | | | | | | |
| Ethyl Oleate | | | | | | | | | |
| Surlyn 8940 | | | | | | 50 | 42.9 | | 47.6 |
| Surlyn 7940 | 38.1 | | | | | 50 | 38.1 | | 47.6 |
| White MB | 37.6 | | | | | | 4.8 | | 4.8 |
| 6.5% NCO MDI/PTMEG Prepolymer | 6.0 | | | | | | | 83.4 | |
| Ethacure 300 Curative blend with TiO2 | | | | | | | | 16.6 | |
| Properties | | | | | | | | | |
| Compression | 135 | 141 | 81 | 43 | 78 | 158 | 150 | 128 | 157 |
| Shore C | 90.2 | 84.2 | 71.3 | 54.4 | 71.6 | 95 | 92 | 72 | 95 |

TABLE 4A-continued

Additional Cover Layer Formulations

| Sample No. | CE2 | CE3 | CE4 | CE5 | CE6 | CE7 | CE8 | CE9 | CE 10 |
|---|---|---|---|---|---|---|---|---|---|
| Shore D | 61.5 | 54.3 | 41.9 | 32.0 | 38.9 | 67 | 64 | 50 | 67 |
| CoR at 125 ft/s | 0.873 | 0.594 | 0.666 | 0.495 | 0.687 | 0.744 | 0.730 | 0.652 | 0.744 |

TABLE 5

Core Formulations

| | Sample No. | | | |
|---|---|---|---|---|
| Composition | a (phr) | b (phr) | c (phr) | D (phr) |
| Polybutadiene | 100 | 100 | 0 | 100 |
| Zinc diacrylate | 18 | 27 | 0 | 27 |
| Process Aid | 1 | 1 | 0 | 1 |
| Antioxidant | 0 | 0.25 | 0 | 0.5 |
| Peroxide | 0.6 | 1 | 0 | 0 |
| Zn PCTP | 0.5 | 0.5 | 0 | 0 |
| Zinc oxide | 12 | 12 | 0 | 13 |
| Polywate 324 | 26.5 | 27 | 20 | 27 |
| Tungsten powder | 0 | 0 | 26 | 0 |
| E8*[1] | 0 | 0 | 100 | 100 |

*[1]Example as found in above Table 4

TABLE 6

Sample Ball Properties

| | Sample No. | | | |
|---|---|---|---|---|
| | 8-1 | 8-2 | 8-3 | 8-4 |
| Inner Core Properties | | | | |
| Composition | a | E1 | None | None |
| Size | 0.8 | 1.1" | — | — |
| Atti Compression | 18 | 33 | — | — |
| CoR | 0.761 | 0.805 | — | — |
| Shore C Surface ($H_{inner\ core\ surface}$) | 57 | 53 | — | — |
| Shore C Center ($H_{inner\ core\ center}$) | 48 | 49 | — | — |
| Outer Core Properties | | | | |
| Composition | b | C | b | d |
| Size | 1.45" | 1.53" | 1.40" | 1.40" |
| Atti Compression | 45 | 83 | 65 | 56 |
| CoR | 0.778 | 0.806 | 0.785 | 0.774 |
| Shore C Surface ($H_{outer\ surface\ of\ oc}$) | 76 | 85 | 80 | 78 |
| Shore C Midpoint ($H_{midpoint\ of\ OC}$) | 55 | 82 | 57 | 63 |
| Core Gradient | 28 | 36 | 23 | 15 |
| Inner Cover Layer | | | | |
| Composition | E1 | CE7 | E2 | CE1 |
| Size | 1.57" | 1.610" | 1.54" | 1.54" |
| Shore D Surface ($H_{surface\ of\ inner\ cov}$) | 53C | 69D | 35D | 47D |
| Shore D Midpoint ($H_{midpoint\ of\ inner\ Cov}$) | 51C | 68D | 34D | 46D |
| Atti Compression | 46 | 96 | 64 | 61 |
| CoR | 0.773 | 0.815 | 0.784 | 0.795 |
| Intermediate Cover Layer | | | | |
| Composition | None | None | CE7 | E4 |
| Size | — | — | 1.62" | 1.61" |
| Shore D Surface ($H_{surface\ of\ intermed\ cov}$) | — | — | 69D | 31D |
| Shore D Midpoint ($H_{midpoint\ of\ intermed\ covC}$) | — | — | 68D | 30D |
| Atti Compression | — | — | 89 | 60 |
| CoR | — | — | 0.814 | 0.785 |

TABLE 6-continued

Sample Ball Properties

| | Sample No. | | | |
|---|---|---|---|---|
| | 8-1 | 8-2 | 8-3 | 8-4 |
| Outer Cover Layer | | | | |
| Composition | CE8 | E7 | CE9 | CE10 |
| Ball Properties | | | | |
| Shore D Surface Hardness | 66D | 53D | 63D | 69D |
| Atti Compression | 69 | 97 | 91 | 76 |
| CoR | 0.804 | 0.812 | 0.802 | 0.811 |
| Initial velocity | 253.9 | 254 | 252.8 | 254.6 |

Additional Examples

In one example, the golf ball is a one-piece ball comprising a plasticized thermoplastic composition and having a size of about 1.62 to 1.80 inches in diameter with a compression in the range of about 0 to about 110. The ball further comprises one or more very thin layers of coating, or paint as is found on a conventional ball. In one particular example of a one-piece ball, the plasticized thermoplastic composition comprises HPF 2000 acid copolymer ionomer resin and 25 wt % ethyl oleate (or other fatty acid ester). In this particular example, the ball has a compression of about 20 and a COR of about 0.800, and the ball has a size of about 1.680 inches in diameter.

In a second example, the golf ball has a two-piece construction comprising a large core made of a plasticized thermoplastic composition and a single cover layer, wherein the core comprising the plasticized thermoplastic composition is formed from HPF 2000 acid copolymer ionomer resin and 30 wt % ethyl oleate; and the cover comprises a 50/50 blend of Surlyn 8940/9910 or 8940/7940 acid copolymer ionomer resin. The ball has a compression of about 25 to about 55 and a COR of at least about 0.800 at 125 ft/sec. The core is about 1.55 to 1.64 inches in diameter, more preferably 1.58 to 1.62 inches. In one particular example, the thickness of the cover is adjusted accordingly so that the ball has an overall size of about 1.68 inches in diameter. If filler is needed to achieve the desired ball weight, the filler may be added to the core and/or cover layers.

In a third example, the golf ball has a two-piece construction comprising a large core made of a plasticized thermoplastic composition and a single cover layer, wherein the core comprising the plasticized thermoplastic composition is formed from HPF 1000 acid copolymer ionomer resin and 30 wt % ethyl oleate; and the cover comprises a 50/50 blend of Surlyn 8940/9910 or 8940/7940 acid copolymer ionomer resin. The ball has a compression of about 30 to 60 and a COR of at least about 0.800 at 125 ft/sec. The core is about 1.55 to 1.64 inches in diameter, more preferably 1.58 to 1.62 inches. In one particular example, the thickness of the cover is adjusted accordingly so that the ball has an overall size of about 1.68 inches in diameter. If filler is needed to achieve the desired ball weight, the filler may be added to the core and/or cover layers.

In a fourth example, the golf ball has a two-piece construction comprising a large thermoset polybutadiene core and a single cover layer made of a plasticized thermoplastic composition. If filler is needed to achieve the desired ball weight, the filler may be added to the core and/or cover layers.

In a fifth example, the golf ball comprises at least 3 layers (a core layer, a relatively thin inner cover (or intermediate layer), and an outermost cover layer.) In one particular example, the core is an unfilled plasticized thermoplastic composition and the inner cover layer is a thin dense layer of ionomer comprising relatively high levels of filler (such as tungsten) to allow the golf ball to achieve a weight of about 1.620 oz. Alternatively, in a 4-piece ball version, two intermediate layers may be used. In another 4-piece ball, there is an inner core comprising unfilled plasticized thermoplastic composition; a thin outer core layer comprising the same or different plasticized thermoplastic composition (or conventional ionomer that does not comprise plasticizer) that contains filler to add weight and an inner cover layer comprising ionomer (but no plasticizer), and an outer cover layer. Using more than one intermediate layer may facilitate incorporation of filler, improve durability, and the like and allow for "tweaking" the desired properties of the golf ball.

In a sixth example, the golf ball comprises at least 3 layers (a core layer of plasticized thermoplastic composition), a relatively thin inner cover (or intermediate layer), and an outermost cover layer. Balls having a diameter greater than 1.68 inches ("oversized balls"), as disclosed in U.S. patent application Ser. Nos.: 14/467,083; 14/467,086; and 14/467,089, the disclosures of which are hereby incorporated by reference, may be made in accordance with the present invention.

In a seventh example, the golf ball comprises at least 3 layers (a core layer, a relatively thin inner cover (or intermediate layer) and an outermost cover layer). The core and/or inner cover and/or outer cover may be made of a plasticized thermoplastic composition. Relatively small and heavy balls may be made. For example, the ball may have a heavy core containing metal filler as disclosed in US Patent Application Publications US 2014/0073456 and US 2014/0073457, the disclosures of which are hereby incorporated by reference.

In an eighth example, the golf ball comprises at least 3 layers (a core layer, a relatively thin inner cover (or intermediate layer) and an outermost cover layer), wherein the core and/or inner cover layer comprise a non-uniform thickness surface having projections as disclosed in U.S. patent application Ser. No. 14/080,930, the disclosure of which is hereby incorporated by reference. The core and/or inner cover and/or outer cover may be made of a plasticized thermoplastic composition.

Any of the above golf ball examples may be further modified so that the ball is an "oversized" ball and has a diameter greater than 1.68 inches as disclosed in U.S. patent application Ser. Nos.: 14/467,083; 14/467,086; and 14/467,089; and/or the ball may be modified so that it has a non-uniform thickness surface having projections as disclosed in U.S. patent application Ser. No. 14/080,930. Golf balls having a core and/or cover layers containing depressions and artifacts also may be prepared. The core and/or inner cover and/or outer cover may be made of a plasticized thermoplastic composition.

Also, any of the above golf ball examples may be further modified to produce a ball having an initial velocity (as measured according to the USGA initial velocity testing methods or calculated using a COR to USGA IV correlation) that is above 255 ft/sec, preferably above 256, and may be above 260, 265, 270 or 280, and preferably has a COR (at 125 ft/sec) of from about 0.800 to 0.950, and more preferably a COR of 0.820 to 0.900. Also, any of the above golf ball examples may be further modified to produce a ball having an initial velocity (as measured according to the USGA initial velocity testing methods or calculated using a COR to USGA IV correlation) that is above 255 ft/sec, preferably above 256, and may be above 260, 265, 270 or 280, and preferably has a COR (at 125 ft/sec) of from about 0.800 to 0.950, and more preferably a COR of 0.820 to 0.900. Further, any of the above golf ball examples may be modified, either to construction, materials, and/or aerodynamics (that is, dimple pattern and dimple dimensions) to produce a ball having an overall distance as measured according to the United States Golf Association (USGA) Overall Distance Standard (ODS), that is over 320 yards, more preferably at least 325 yards and may be at least 330, 340, or 350 yards or more.

It is understood that the compositions and golf ball products described and illustrated herein represent only some embodiments of the invention. It is appreciated by those skilled in the art that various changes and additions can be made to compositions and products without departing from the spirit and scope of this invention. It is intended that all such embodiments be covered by the appended claims.

We claim:

1. A golf ball, comprising:
   i) a core having at least one layer;
   ii) an inner cover layer comprising a thermoplastic material, the inner cover layer being disposed about the core and having a Shore D midpoint hardness in the range of about 55 to about 75, the thermoplastic material comprising:
      a) an acid copolymer of ethylene and an α,β-unsaturated carboxylic acid, optionally including a softening monomer selected from the group consisting of alkyl acrylates and methacrylates;
      b) a plasticizer in an amount of abut 3 to about 50% by weight, wherein the plasticizer is an alkyl oleate selected from the group consisting of methyl oleate, ethyl oleate, propyl oleate, butyl oleate, and octyl oleate, and mixtures thereof; and
      c) a cation source present in an amount sufficient to neutralize from about 0 to about 100% of all acid groups present in the material; and
   iii) an outer cover layer disposed about the inner cover layer and having a Shore D surface hardness in the range of about 15 to about 60, wherein the hardness of the outer cover layer is less than the hardness of the inner cover layer, and wherein the ball has a compression of less than 60.

2. A golf ball, comprising:
   i) a core having at least one layer;
   ii) an inner cover layer being disposed about the core;
   iii) an intermediate cover layer comprising a thermoplastic material, the intermediate layer being disposed about the inner cover layer, the thermoplastic material comprising:
      an acid copolymer of ethylene and an α, β-unsaturated carboxylic acid, optionally including a softening monomer selected from the group consisting of alkyl acrylates and methacrylates;
      b) a plasticizer in an amount of about 3 to about 50% by weight, wherein the plasticizer is an alkyl oleate selected from the group consisting of methyl oleate, ethyl oleate, propyl oleate, butyl oleate, and octyl oleate, and mixtures thereof; and, c) a cation source present in an amount sufficient to neutralize from about 0 to about 100% of all acid groups present in the material; and iv) an outer cover layer disposed about the intermediate cover layer, and wherein the ball has a compression of less than 60.

3. The golf ball of claim 2, wherein the inner and intermediate cover layers have midpoint hardness levels and the outer cover layer has an outer surface hardness; and the midpoint hardness of the inner cover layer ($H_{inner\ cov}$) is greater than the midpoint hardness of the intermediate cover layer ($H_{intermed\ cov}$); and $H_{intermed\ cov}$ is greater than the surface hardness of the outer cover layer ($H_{outer\ cov}$).

4. The golf ball of claim 2, wherein the ball has a compression in the range of about 25 to about 55.

5. The golf ball of claim 2, wherein the thermoplastic material comprises an ethylene acid copolymer containing acid groups such that 70% or greater of the acid groups are neutralized.

6. The golf ball of claim 2, wherein the inner and intermediate cover layers have midpoint hardness levels and the outer cover layer has an outer surface hardness; and the midpoint hardness of the inner cover layer ($H_{inner\ cov}$) is greater than the midpoint hardness of the intermediate cover layer ($H_{intermed\ cov}$) and the surface hardness of the outer cover layer ($H_{outer\ cov}$) is greater than $H_{intermed\ cov}$.

* * * * *